(12) United States Patent
Burroughs et al.

(10) Patent No.: US 11,785,442 B2
(45) Date of Patent: Oct. 10, 2023

(54) DATA TRANSPORT NETWORK PROTOCOL BASED ON REAL TIME TRANSPORT NETWORK CONGESTION CONDITIONS

(71) Applicant: Opanga Networks, Inc., Seattle, WA (US)

(72) Inventors: Thomas Burroughs, Seattle, WA (US); John Burnette, Seattle, WA (US); Dave Gibbons, Seattle, WA (US); Ethan Nordness, Seattle, WA (US); Ben Hadorn, Seattle, WA (US)

(73) Assignee: Opanga Networks, Inc., Bellevue, WA (US)

( * ) Notice: Subject to any disclaimer, the term of this patent is extended or adjusted under 35 U.S.C. 154(b) by 345 days.

(21) Appl. No.: 17/139,819

(22) Filed: Dec. 31, 2020

(65) Prior Publication Data
US 2021/0203606 A1    Jul. 1, 2021

Related U.S. Application Data

(60) Provisional application No. 62/956,135, filed on Dec. 31, 2019, provisional application No. 62/956,138, (Continued)

(51) Int. Cl.
*H04W 8/04* (2009.01)
*H04L 47/11* (2022.01)
(Continued)

(52) U.S. Cl.
CPC .............. *H04W 8/04* (2013.01); *H04L 41/12* (2013.01); *H04L 43/08* (2013.01); (Continued)

(58) Field of Classification Search
CPC ..... H04L 41/12; H04L 43/08; H04L 43/0876; H04L 43/16; H04L 47/11; (Continued)

(56) References Cited

U.S. PATENT DOCUMENTS 6,377,987 B1    4/2002 Kracht
6,704,288 B1    3/2004 Dziekan
(Continued)

OTHER PUBLICATIONS

International Search Report and Written Opinion for PCT/US2020/067733, dated Jun. 16, 2021.

*Primary Examiner* — Dung B Huynh

(57) ABSTRACT

A process for managing network congestion uses crowd-sourced real-time information about current conditions in a network. The crowd-sourced real-time information may include information on a shared channel, such as a cell of a wireless network, produced by monitoring data sessions in the network and using mapping information that maps IP addresses of the data sessions to cell identifiers to associate measurements of the data sessions with corresponding cells. The measurements corresponding to a cell may be used to create and/or update a congestion profile for the cell, and the congestion profile may be used to select and set parameters of a congestion control algorithm. The congestion control algorithm may include an Initial Congestion Window Algorithm for controlling a congestion window.

18 Claims, 9 Drawing Sheets

Related U.S. Application Data filed on Dec. 31, 2019, provisional application No. 62/956,104, filed on Dec. 31, 2019.

(51) Int. Cl.

| | | |
|---|---|---|
| *H04L 41/12* | (2022.01) | |
| *H04L 47/27* | (2022.01) | |
| *H04L 47/127* | (2022.01) | |
| *H04L 43/0876* | (2022.01) | |
| *H04L 43/08* | (2022.01) | |
| *H04L 43/16* | (2022.01) | |
| *H04L 9/40* | (2022.01) | |
| *H04L 65/80* | (2022.01) | |
| *H04N 21/24* | (2011.01) | |
| *H04L 67/50* | (2022.01) | |

(52) U.S. Cl.
CPC .......... *H04L 43/0876* (2013.01); *H04L 43/16* (2013.01); *H04L 47/11* (2013.01); *H04L 47/127* (2013.01); *H04L 47/27* (2013.01); *H04L 63/1425* (2013.01); *H04L 65/80* (2013.01); *H04L 67/535* (2022.05); *H04N 21/2402* (2013.01)

(58) Field of Classification Search
CPC ........... H04L 47/12727; H04L 63/1425; H04L 65/80; H04L 67/535; H04W 28/0289; H04W 8/04
See application file for complete search history.

(56) References Cited

U.S. PATENT DOCUMENTS

| | | | | |
|---|---|---|---|---|
| 10,181,977 B2* | 1/2019 | Lee | ..................... | H04L 41/0803 |
| 2002/0161879 A1 | 10/2002 | Richard | | |
| 2003/0103452 A1* | 6/2003 | Le | ......................... | H04L 47/193 |
| | | | | 370/328 |
| 2004/0221249 A1* | 11/2004 | Lahner | ..................... | G06F 30/33 |
| | | | | 716/102 |
| 2005/0052992 A1* | 3/2005 | Cloonan | ............... | H04L 69/329 |
| | | | | 348/E7.063 |
| 2005/0088972 A1* | 4/2005 | Zhang | ....................... | H04W 8/04 |
| | | | | 370/235 |
| 2005/0135248 A1* | 6/2005 | Ahuja | ...................... | H04L 47/10 |
| | | | | 370/235 |
| 2006/0059256 A1* | 3/2006 | Kakani | ................. | H04L 69/163 |
| | | | | 709/224 |
| 2006/0187840 A1* | 8/2006 | Cuffaro | ................. | H04W 48/06 |
| | | | | 370/235 |
| 2008/0084826 A1* | 4/2008 | Ong | ......................... | H04L 47/10 |
| | | | | 370/237 |
| 2009/0232037 A1* | 9/2009 | Dixit | ................. | H04W 52/0225 |
| | | | | 370/341 |
| 2011/0211449 A1* | 9/2011 | Attar | ....................... | H04L 47/10 |
| | | | | 370/235 |
| 2012/0155269 A1* | 6/2012 | Kim | .................... | H04L 43/0882 |
| | | | | 370/235 |
| 2012/0163167 A1* | 6/2012 | Dade | ................. | H04W 28/0273 |
| | | | | 370/229 |
| 2012/0270553 A1 | 10/2012 | Ha | | |
| 2013/0250853 A1* | 9/2013 | Eravelli | ............ | H04W 28/0273 |
| | | | | 370/328 |
| 2014/0029620 A1* | 1/2014 | Zheng | ..................... | H04L 69/16 |
| | | | | 370/392 |
| 2014/0064072 A1* | 3/2014 | Ludwig | ................... | H04L 47/33 |
| | | | | 370/230 |
| 2014/0135031 A1 | 5/2014 | Weiguo | | |
| 2014/0241159 A1* | 8/2014 | Kakadia | ................ | H04L 41/083 |
| | | | | 370/235 |
| 2014/0241163 A1* | 8/2014 | Lee | ........................ | H04W 48/16 |
| | | | | 370/235 |
| 2014/0369188 A1* | 12/2014 | Seleznyov | .............. | H04W 4/50 |
| | | | | 370/229 |
| 2015/0023172 A1* | 1/2015 | Calavrezo | ................ | H04L 47/11 |
| | | | | 370/236 |
| 2015/0271225 A1* | 9/2015 | Mao | ...................... | H04L 65/764 |
| | | | | 709/219 |
| 2015/0304209 A1 | 10/2015 | Choudhury et al. | | |
| 2016/0142318 A1 | 5/2016 | Beecroft | | |
| 2016/0164785 A1* | 6/2016 | Flores | ..................... | H04L 47/27 |
| | | | | 370/237 |
| 2016/0255005 A1* | 9/2016 | Ramaiah | ............ | H04L 43/0864 |
| | | | | 370/231 |
| 2016/0277943 A1* | 9/2016 | Isobe | .................... | H04L 67/561 |
| 2016/0352581 A1 | 12/2016 | Danforth | | |
| 2016/0373361 A1* | 12/2016 | Dhanabalan | ............. | H04L 47/11 |
| 2016/0380898 A1* | 12/2016 | Englund | ............... | H04L 47/193 |
| | | | | 370/235 |
| 2017/0086211 A1* | 3/2017 | Sahin | ..................... | H04W 72/12 |
| 2017/0187641 A1* | 6/2017 | Lundqvist | ........... | H04L 43/0888 |
| 2017/0289041 A1* | 10/2017 | Li | .............................. | H04L 9/40 |
| 2017/0289838 A1* | 10/2017 | Agrawal | .................. | H04L 67/56 |
| 2017/0331753 A1* | 11/2017 | Li | .............................. | H04L 47/27 |
| 2017/0339022 A1* | 11/2017 | Hegde | ..................... | G06N 3/044 |
| 2017/0366650 A1* | 12/2017 | Zhu | ......................... | H04L 69/16 |
| 2018/0097739 A1* | 4/2018 | De Vleeschauwer | .. | H04L 47/39 |
| 2018/0132110 A1* | 5/2018 | Furuichi | ................. | H04L 47/27 |
| 2018/0139629 A1* | 5/2018 | Chakrabarti | ........ | H04L 41/0896 |
| 2018/0262924 A1 | 9/2018 | Dao et al. | | |
| 2018/0309664 A1* | 10/2018 | Balasubramanian | ........................ H04L 47/122 | |
| 2018/0349803 A1* | 12/2018 | Jorgensen | ............. | H04W 72/52 |
| 2019/0124043 A1* | 4/2019 | Xu | ......................... | H04L 65/102 |
| 2019/0124547 A1 | 4/2019 | Dasgupta et al. | | |
| 2019/0182170 A1* | 6/2019 | Kulkarni | .................. | H04L 47/11 |
| 2019/0319889 A1* | 10/2019 | Zhang | ..................... | H04L 69/22 |
| 2019/0334825 A1* | 10/2019 | Nádas | .................... | H04L 1/1874 |
| 2020/0128056 A1* | 4/2020 | Simotas | ................. | H04L 65/611 |
| 2020/0196187 A1* | 6/2020 | Gong | ......................... | H04W 4/44 |
| 2020/0280518 A1* | 9/2020 | Lee | ......................... | H04L 47/115 |
| 2020/0344643 A1* | 10/2020 | Zhou | ......................... | H04W 76/14 |
| 2020/0366610 A1* | 11/2020 | Wang | ..................... | H04L 45/302 |
| 2020/0404536 A1* | 12/2020 | Han | ...................... | H04W 24/08 |
| 2021/0067452 A1* | 3/2021 | Ramachandran | ..... | H04L 47/193 |
| 2021/0160183 A1* | 5/2021 | Mindler | ................. | H04L 43/08 |
| 2021/0176192 A1* | 6/2021 | Li | ....................... | H04L 41/0895 |
| 2021/0203606 A1* | 7/2021 | Burroughs | .............. | H04W 8/04 |
| 2021/0226873 A1* | 7/2021 | Zhou | ....................... | H04L 47/11 |
| 2021/0258824 A1* | 8/2021 | John | ....................... | H04W 76/10 |
| 2021/0266265 A1* | 8/2021 | Choi | ..................... | H04L 47/37 |
| 2021/0400069 A1* | 12/2021 | Mitani | .................. | H04L 41/147 |
| 2022/0060929 A1* | 2/2022 | Hassan | ............... | H04W 28/0284 |
| 2022/0070722 A1* | 3/2022 | Wang | ..................... | H04W 72/21 |
| 2022/0103483 A1* | 3/2022 | Shah | ....................... | H04L 47/19 |
| 2022/0123869 A1* | 4/2022 | Legallais | ............ | H04L 1/1657 |
| 2022/0210084 A1* | 6/2022 | Bowers | .................... | H04L 47/32 |

* cited by examiner

FIG. 2
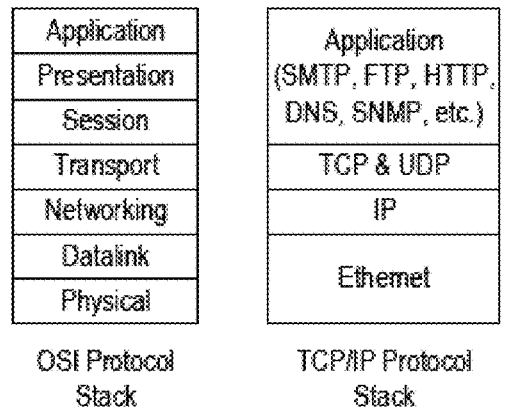
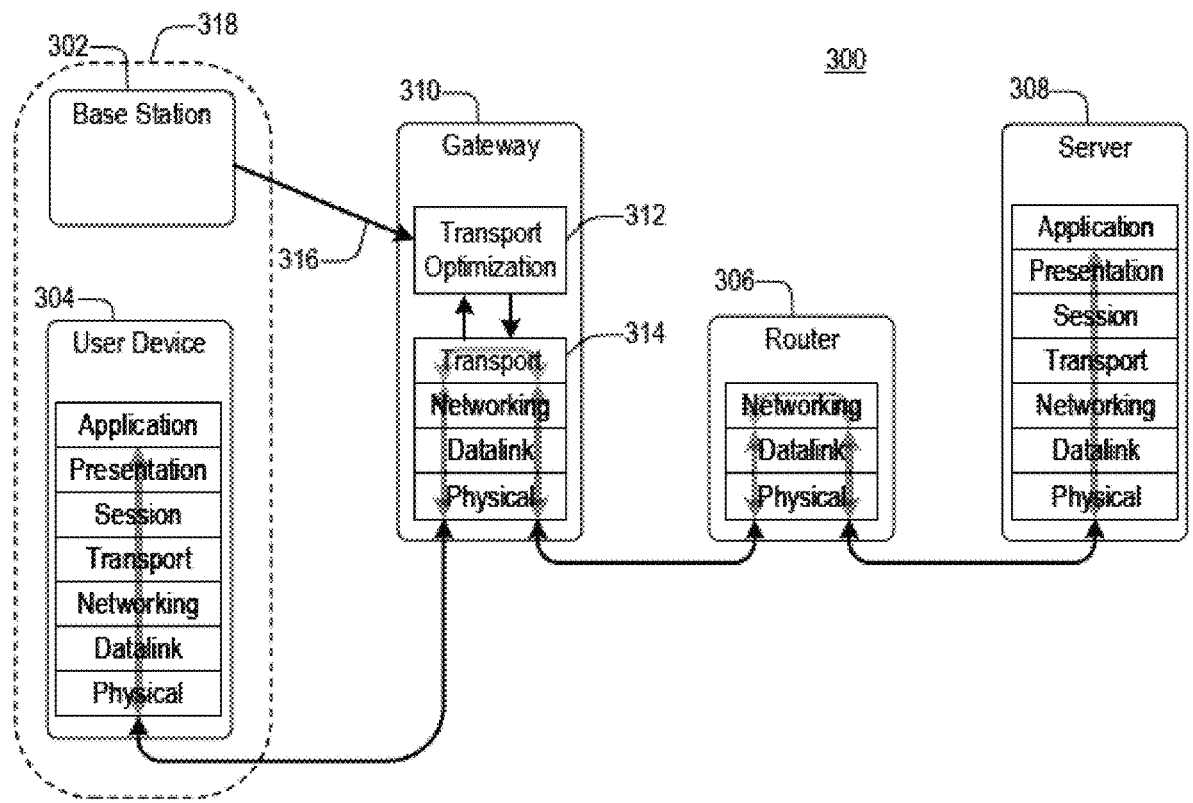
FIG. 3

DATA TRANSPORT NETWORK PROTOCOL BASED ON REAL TIME TRANSPORT NETWORK CONGESTION CONDITIONS

CROSS REFERENCE TO RELATED APPLICATIONS

This application claims the benefit of U.S. Provisional Patent Application No. 62/956,104, filed on Dec. 31, 2019, U.S. Provisional Patent Application No. 62/956,135, filed on Dec. 31, 2019, and U.S. Provisional Patent Application No. 62/956,138, filed on Dec. 31, 2019, each of which is incorporated by reference herein in their entirety for all purposes.

BACKGROUND

Data transport protocols may implement a fair-share component to their protocol stack which either increases or reduces data packet transmit rate based on transport measurements (e.g., data loss, latency, throughput). Fair-share implementations can vary between different transport protocols (for example, Transmission Control Protocol (TCP), User Datagram Protocol (UDP), and the like) but the goal is the substantially same: to give each competing data transfer equal access of the shared data transport environment. For example, if there is a 10 Mbps transport environment and 5 unique data transport connections, the fair-share component would attempt to give each data transfer session ~2 Mbps, thus providing a fair network environment.

The TCP was developed as one of the original Internet protocols. Congestion control algorithms used with TCP allow a connection to probe a channel capacity and discover when it "bumps into" another connection. The connection then constantly tries to adapt how much transmitted data can be sent to a receiver during a single round-trip time (RTT) to the receiver (the receiver's "congestion window") to find its true fair share without overwhelming the other connections.

FIG. 13 illustrates a slow start stage and a congestion avoidance stage of a TCP congestion control algorithm. The graph reflects the behavior of the algorithm on a typical wired WAN connection such as the internet. Here, "wired" may include fiber optic and/or point-to-point radio or optical links, as well as actual wires.

The TCP congestion control algorithm begins operating in the slow start stage, during which an initially-small congestion window increases at an exponential rate by doubling every RTT until a packet is lost (i.e., an acknowledgement of the packet is not timely received). This is based on the assumption that the loss of the packet was due to congestion in the network.

In response to detection of a packet loss during the slow start stage, the TCP congestion control algorithm switches to the congestion avoidance stage. During the congestion avoidance stage, the congestion window size increases linearly (e.g., by 1 Maximum Segment Size (MSS) each RTT) until a packet loss is detected. In response to the packet loss, the congestion window size is decreased by multiplying it by a value less than 1, such as 0.5. After the congestion window size is decreased, it resumes increasing linearly every RTT until a packet loss is again detected, at which point the multiplicative reduction is again performed.

A radio access network (RAN) and a wired WAN (e.g., the Internet) have fundamental differences that are problematic for standard data transport protocols having behavior similar to that shown in FIG. 13. For example, the RAN is typically a higher latency network with a larger variability in round trip time (RTT) measurements (e.g., 60-500 ms), whereas the Internet provides more consistent and generally lower RTT measurement (e.g., 40-60 ms). The conditions in which RAN-using data transfers exist is highly variable and can cause a data transfer session to continuously adjust its data transport rate based on variables that in the end, have no impact on shared network "fair-share" policies. RTT, for example, is a poor way to measure the congestion of the shared data transport network in the scenario explained above where one part of the network is by design a high and variable latency network.

Some congestion control processes may drop packets to signal the presence of congestion. However, in networks such as RANs, packets may be dropped for a variety of reasons, such as due to temporary interference. Misinterpreting a packet dropped because of temporary interference as indicating congestion can cause underutilization of a RAN's capacity and reduce data transport performance.

Therefore the TCP congestion control algorithm of the related arts is not well suited to RANs. First, the algorithm is sensitive to RTT, which may be much higher in a RAN than in a wired network. Second, the algorithm assumes every lost packet is a result of network congestion, which is not the case in RANs. These two factors cause the algorithm to deliver lower average throughput than necessary to prevent congestion and larger unjustified variations in performance over time.

Furthermore, this TCP congestion control algorithm makes no use of information about other users of the channel over which the transmissions are being performed, or the condition of that channel. Accordingly, the algorithm learns its fair share "from scratch" every time a connection is established, using the same initial congestion window value for each connection regardless of channel condition and occupancy, resulting in longer "slow start" times and lower average throughput.

As used herein, the term "congestion policy" is an algorithm applied to prevent or alleviate the deterioration in quality of service of a network node or link when it is carrying more data than it can handle. In an embodiment, the congestion policy refers to congestion control algorithms that prevent the senders from overwhelming the network by controlling the traffic that is placed by the transport layer into the network. In another embodiment, the congestion policy may also include flow control algorithms that prevent the sender from overwhelming the receiver.

A need exists for a congestion policy adapted to the characteristics of RANs and hybrid RAN/WAN networks. Furthermore, it would be beneficial to have a congestion policy that leverages additional information that may be available in a RAN, compared to a WAN such as the Internet, to, for example, adapt to real-time changes in network conditions.

BRIEF SUMMARY OF THE DISCLOSURE

Embodiments relate to network optimization using real-time network topology information. In an embodiment, the network topology information may be obtained using the methods disclosed in, for example, U.S. patent application Ser. No. 16/363,749, titled COORDINATED DATA SHARING IN VIRTUALIZED NETWORKING ENVIRONMENTS. The real-time knowledge of the network topology of end users may be used effectively for network optimization.

In an embodiment, network topology information (which may be or include a channel congestion profile) is an aggregation or sub-aggregation of crowd-sourced information (including but not limited to subscriber throughput, subscriber latency, transport layer congestion parameters, and application layer congestion parameters) from subscribers (i.e., subscribed devices) on a shared network channel (e.g. a cell or eNodeB) and could include RAN parameters (such as a QoS Class Identifier (QCI)), validity indicators, and metrics derived from this information.

In an embodiment, the network topology information may be obtained using crowd-sourced data from external and internal sources and may be used to adaptively drive optimization settings. For example, based on the network topology information, a TCP optimization may shorten or skip the slow start stage of a congestion window algorithm, set the initial congestion window to a size corresponding to the congestion avoidance stage, reduce the saw-tooth process regarding the congestion window, and reach the optimal fair-share bandwidth among users of a shared channel in a minimal time period.

Embodiments include a method for optimizing network efficiency, the method comprising: obtaining network topology information for a shared channel, the network topology information including information obtained by monitoring control and data packets transmitted through the channel; determining, for a connection that uses the shared channel, a congestion control algorithm, a parameter of the congestion control algorithm, or both; and managing a data flow of the connection according to the congestion control algorithm, the parameter of the congestion control algorithm, or both.

In an embodiment, determining the congestion control algorithm comprises: in response to a request to establish the connection, determining, using the network topology information, an Initial Congestion Window Algorithm (ICWA).

In an embodiment, determining the ICWA comprises selecting, according to the network topology information, an algorithm without a slow start stage.

In an embodiment, determining the ICWA comprises selecting, according to the network topology information, an algorithm having a fast slow start stage. In the fast slow start stage, an initial congestion window is set according to a first parameter, and the congestion window grows by an exponentially increasing increment over time.

In an embodiment, determining the parameter of the congestion control algorithm includes determining a size of an initial congestion window according to the network topology information.

In an embodiment, the method comprises updating parameters of the congestion control algorithm in response to changes in the network topology information.

In an embodiment, the method comprises determining the congestion control algorithm, the parameter of the congestion control algorithm, or both using a congestion profile included in the network topology information. The congestion profile includes one or more congestion-related time-windowed measurements of a data stream transported by the shared channel, and an identifier of the shared channel.

In an embodiment, the method comprises determining, according to the network topology information, to enlarge an advertised receive window of a device, the device being a first endpoint of the connection, by scaling the advertised receive window received from the device and transmitting the scaled advertised receive window to a second endpoint of the connection.

In an embodiment, the method comprises: determining, using the network topology information, that a valid congestion profile does not exist for the shared channel; and in response to determining that the valid congestion profile does not exist for the shared channel, determining the congestion control algorithm, the parameter of the congestion control algorithm, or both using a global default congestion profile or, a default congestion profile determined according to a characteristic of the shared channel.

In an embodiment, determining the congestion control algorithm, the parameter of the congestion control algorithm, or both includes: determining, using the network topology information, a target throughput for a device that is an endpoint of the connection; determining, using the target throughput for the device, the target throughput for the connection, where the target throughput for the connection is different from the target throughput for the device; and determining the congestion control algorithm, the parameter of the congestion control algorithm, or both according to the target throughput for the connection.

Embodiments may also include a non-transitory computer readable medium having computer-executable instructions embodied thereon that when executed by at least one processor cause the processor to perform one or more of the methods described above.

Embodiments may also include a system including at least one processor and configured to perform one or more of the methods described above.

BRIEF DESCRIPTION OF THE DRAWINGS

FIG. 2 illustrates communication protocol stacks pertinent to some embodiments.

FIG. 3 illustrates a data transfer in a communication network according to an embodiment.

DETAILED DESCRIPTION

Figure 1:
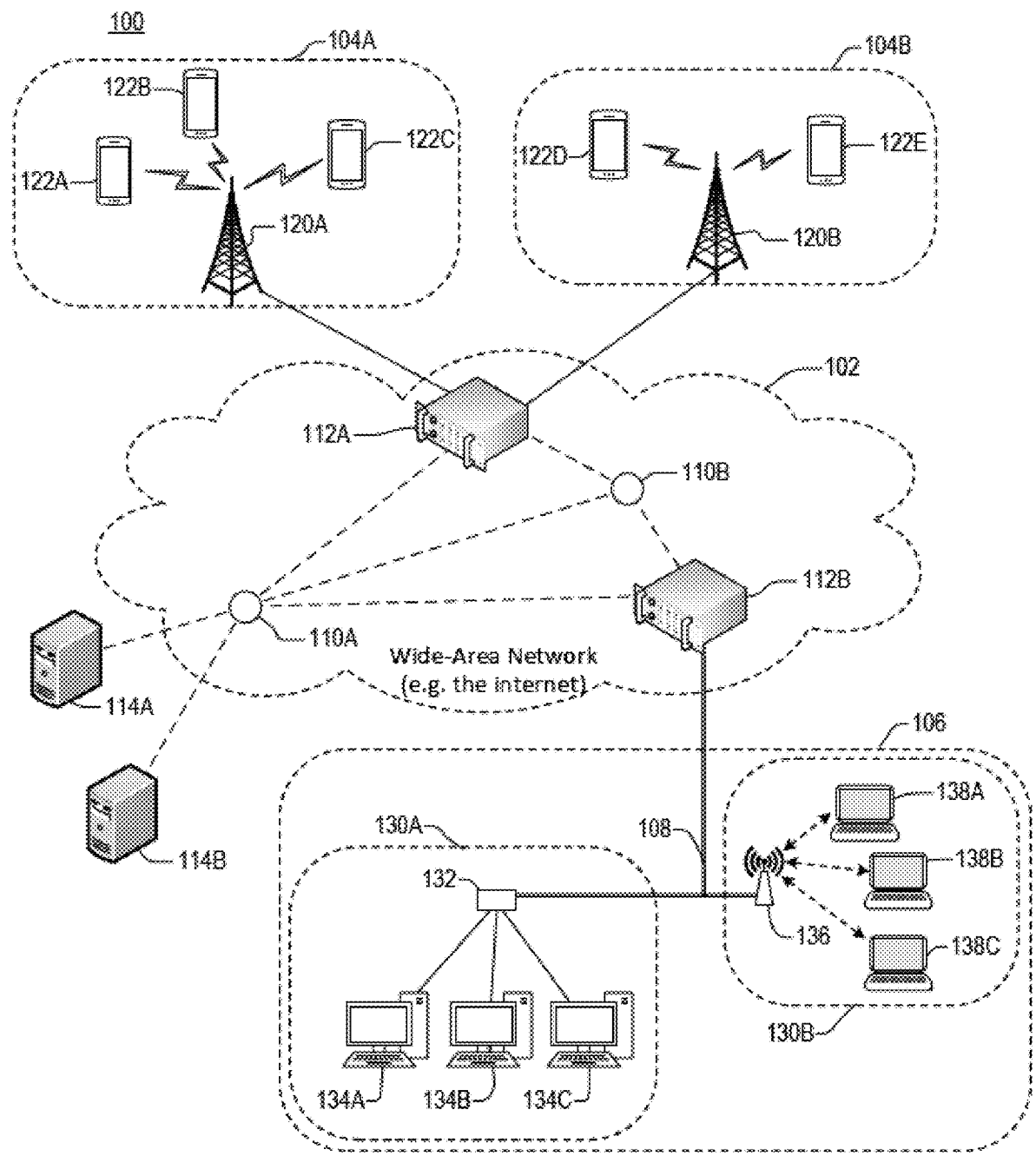
FIG. 1 illustrates a communication network according to an embodiment.

Embodiments use crowd-sourced information about current conditions in a network to determine an Initial Congestion Window Algorithm (ICWA) for a new TCP data session of a User Equipment (UE) and to set parameters for the ICWA. For example, in response to current conditions, embodiments may, among other things, use an ICWA that skips the "slow start" stage of a typical ICWA, set a larger ICW for the UE, enlarge an advertised receive window of the UE, set a different threshold for changing from the slow-start stage to a congestion avoidance stage, dynamically alter a growth rate of the congestion window, or combinations of the above.

Embodiments of the present disclosure relate to accelerating or decelerating data transport sessions, which may also be referred to as data sessions. For example, when a new data transport session is created in a network and information about network conditions indicate that the network is operating well under capacity, the data transport may use a larger than usual initial congestion window and may begin managing the size of congestion window according to a "congestion avoidance" algorithm, skipping a "slow start" algorithm that would otherwise be initially used to manage the size of the congestion window. The information about the network conditions may be determined using, inter alia, "crowd sourced" information derived from data transport sessions carried by the network, which data transport sessions may be mapped to specific portions (e.g., specific cells) of the network.

In an embodiment, the network topology information is used to dynamically set an initial congestion window for each shared channel (e.g., divergent path or cell channel) in a network being managed by a network optimization system. The network topology information may include how many users in a given shared channel, how many are active users, size of the shared channel, type of shared channel (e.g., 3G, 4G, etc.), and other information relating to the shared channel. Here, a user may correspond to a User Equipment (UE) such as a cell phone.

For example, when a new user connects to a shared channel and that user is determined, based on the network topology information, to be the only currently active user, then the initial congestion window for that user may be set to fully utilize the entire bandwidth of the shared channel, thereby entirely foregoing the slow start stage of the congestion control algorithm. At different moments in time, the initial congestion window may be set differently for users connecting to the shared channel based on the respective current network topology information for those different moments.

Also, when there are many users connected to the shared channel (i.e., the cell), the network topology information based on crowd-sourced data may be used to set the initial congestion window for new users of the shared channel. That is, the initial congestion window may be set for a new user based on the performance experienced by other users in the shared channel, which may reduce or eliminate the slow start stage of the congestion control algorithm.

Additionally, each shared channel may be provided with a respective initial congestion window based on its current network topology information. In an embodiment, the initial congestion window for each shared channel may be dynamically every second or fraction of a second.

In an embodiment, an optimization system receives an advertised client receive window from a client, scales it by a configurable factor, and advertises the scaled receive window to the server side as the advertised receive window. This allows the system to ACK data from the server faster than the client, thereby allowing the system to deliver data to the client at a rate that is greater than the advertised client receive window. The optimization system removes a buffer bottleneck. Subsequently, when the client can receive at a faster rate subsequently, then the system sends the data buffered in the optimization system at the faster rate without having to request additional data from the server. The amount of scaling or additional data requested by the optimization system may be based on the network topology information (e.g., user cell location and target throughput estimate), data volume delivery, an application type, a degree of user mobility, or a static setting. That is, the optimization system may set how much more data to ask for from the server dynamically based on the understanding of the network topology as well as other relevant factors. A TCP proxy of the related art applies a static setting and does not dynamically adjust the setting, particularly since it is ignorant of much of the network topology information such as a number of users and a number of active users in a shared channel.

In an embodiment, the scale-up factor used to scale the client internet-side receive window may adjusted based on a target throughput estimate accuracy and the buffer size of an eNodeB.

In an embodiment, after setting the initial congestion window, the congestion control process is prevented from entering the congestion avoidance stage. The congestion avoidance stage grows the congestion window a single packet per RTT which might result in a significant delay until an optimal size for congestion avoidance is reached. Accordingly, the congestion control sets the protocol to start as a slow start stage according to an embodiment.

In an embodiment, the congestion control process initially sets the protocol to a "fast" slow start stage (or modified growth stage) using an "exponential head start" (EHS). In the "fast" slow start stage of this embodiment, the initial congestion window is set to a higher initial size, and then grows at an exponentially increasing step size (e.g., 2 packets, 4 packets, 8 packets . . . ) per RTT until the congestion avoidance stage is reached or a congestion event occurs. That is, during the "fast" slow start stage, $$CW(0)=EHS\_size, \quad \text{Equation 1A}$$

$$CW(n)=CW(n-1)+\text{initial\_step\_size}\times 2^n, \quad \text{Equation 1B}$$

where $CW(0)$ is the initial congestion window, n is an integer greater than or equal to 1, $CW(n)$ is the congestion window after n Round Trip Times (RTTs) have elapsed since the initial congestion window was set, EHS_size is a configurable parameter which may be equal to 2 or more times the Maximum Segment Size (MSS), and initial_step_size is a configurable parameter which may be equal to 1 or more MSS. The EHS_size, the initial_step_size, or both may respectively be predetermined or determined according to current conditions in the channel.

In an embodiment, the speed of the modified growth stage is adjusted dynamically based on the network topology information for the corresponding shared channel at a given point in time. For example, the initial growth may be set at 4 packets per RTT and then may be adjusted to 2 packets per RTT based on the changes to the network topology information for that shared channel.

In an embodiment, when the slow start stage ends the congestion control applies a modified growth stage as described above instead of entering the congestion avoidance stage, and thereby packets increase by 1 or more per RTT based on the network topology information at a given point in time.

In an embodiment, the initial congestion window may be set aggressively so that the congestion control process is more likely to overshoot than undershoot the optimal congestion avoidance value for the congestion window, because eNodeBs may have large buffers that can accommodate larger burst of data being sent to the client. Accordingly, in an embodiment, the scale-up factor for the advertised client receive window is configured to overshoot the initial congestion window. The scale-up factor can be set statically or automatically based on the Target Throughput Estimate Accuracy Metric. The more accurate the estimate, the more conservative the scale-up factor. Less accurate means there are less users, which means less sharing, so the scale-up factor can be higher.

In an embodiment, the target throughput is estimated for an initial congestion window by using sampled data from the network, combining crowd sourced data for a specific cell (ECI), and learning what the actual fair share throughput is for each user. The accuracy of this estimate is driven by the number of available data samples, which data samples comes from active user sessions. The more users, the more sessions, and the more accurate the estimate.

In an embodiment, a target throughput accuracy table is generated. The table correlates the accuracy of the Target Throughput Estimate to the number of active users and active data session samples. Accuracy levels may be derived from this table.

Additionally, the table may be establish based on cell size (e.g. 5 Mhz cell, 10 MHz, 20 MHz, etc.) since what might be considered an adequate number of users to achieve a good estimate for a 5 MHz cell may not be enough for a 20 MHz cell.

In an embodiment, each ECI (or shared channel) is monitored to learn the peak throughput capability of the cell (e.g., during lower usage hours). The cell size buckets for the ECI may be determined based on the monitored peak throughput and assign a cell size level for each ECI, e.g., cell size level 1, 2, 3, etc. These size levels can correspond to bandwidth (MHz). This information may be used in the initial congestion window algorithm Target Throughput Estimator defaults as well as for the Target Throughput Accuracy Metric.

In an embodiment, a maximum bound is set for the RTT for purposes of bandwidth estimation. For example, if the RTT is 2 seconds, its value is adjusted to a maximum value, e.g., 0.5 second, thereby setting anything over 0.5 second to 0.5 second.

If the active user counts fall below a certain threshold (which may be based on the Cell Size Estimate), then there are simply not enough users to even bother with a slow start. In an embodiment, the threshold is set based on number of active users and a cell size, or based on a ratio of a number of active users to a maximum number of active users. In such a situation, the Target Throughput is set very large (e.g., 100 Mbps) or set to the peak throughput reported for the Cell Size Level.

In an embodiment, an optimization system obtains additional measurements (such as throughput or RTT latency) from external systems that provide more information on current user throughputs, and use this as part of the crowd data for Target Throughput Estimates.

For example, a TCP optimizer may measure state-state throughput for large files (elephants) on a second by second basis. These are very good data samples since they are measured for data sessions that typically demand the full network channel and have larger data bursts. The information on these Elephant throughput samples may be obtained by the optimization system. Additionally, the optimization system may apply a weighting factor to these samples.

The optimization system may also obtain steady-state samples for UDP-QUIC data.

In an embodiment, an optimization system uses historical crowd source information to determine which cells have users on them and which ones do not. The system can determine, based on a threshold (e.g., active users, average throughput, etc.) whether or not a cell should be optimized at all during an upcoming interval. If the cell does not need any optimization then the system directly forwards the users sessions within that cell, thus saving system compute resources.

In addition, if the system detects that a subscriber flow is a larger flow then it may decide to stop optimizing that flow and save system resources since transport optimization is more likely to provide performance gains for smaller flows where improving initial congestion window has the most impact. In an embodiment, an initial congestion window algorithm corresponding to an embodiment is not applied to those flows that are determined to be elephant flows.

FIG. 1 illustrates a communication network 100 according to an embodiment. The network 100 includes a Wide-Area Network (WAN) 102 (for example, the Internet), a plurality of cellular Radio Access Networks (RANs) 104A and 104B, a cable or DSL based Internet Access Network (IAN) 106, and a plurality of servers 114A and 114B attached to the WAN 102. However, embodiments are not limited thereto.

The WAN 102 includes a plurality of routers 110A and 110B, a first gateway 112A, and a second gateway 112B all in direct or indirect communication with each other. The routers 110A and 110B operate at a networking layer of a protocol stack (for example, at the Internet Protocol (IP) layer of a TCP/IP Protocol stack) to route packets. That is, the routers 110A and 110B perform their functions using information provided in the IP headers of an IP datagram.

The gateways 112A and 112B operate at a transport layer or higher of a protocol stack. For example, the gateways 112A and 112B may operate using information in User Datagram Protocol (UDP) headers, Transmission Control Protocol (TCP) headers, and/or other transport layer protocol headers, the transport layer protocol headers being encapsulated in the IP data of IP datagrams.

The first gateway 112A may also function as an aggregation point for the RANs 104A and 104B. Furthermore, the first gateway 112A may provide transport management and monitoring and control functions for the RANs 104A and 104B. The first gateway 112A may communicate with the RANs 104A and 104B through a backhaul network.

In an embodiment, the first gateway 112A provides transport optimization for the RANs 104A and 104B, including real-time optimization of fair-share transport protocols in response to congestion on the RANs 104A and 104B. The first gateway 112A may receive real-time information on traffic in each of the RANs 104A and 104B, such as information on throughput, latency, round-trip time, jitter, number of competing concurrent flows, and so on, and may use the real-time information to perform the real-time optimization of the fair-share transport protocols.

Similarly, the second gateway 112B may function as an aggregation point for the IAN 106, provide transport management, monitoring, and control functions for the IAN 106, and provides transport optimization for the IAN 106, including real-time optimization of fair-share transport protocols in response to congestion on the IAN 106.

The first RAN 104A includes a first base station 120A and a plurality of User Equipment (UEs) 122A, 122B, and 122C wirelessly communicating with the first base station 120A over a shared radio-frequency (RF) resource. The second RAN 104B includes a second base station 120B and a plurality of UEs 122D and 122E wirelessly communicating with the second base station 120B over the shared RF resource. The UEs 122A to 122E communicate with the WAN 102 via the base stations 120A and 120B and the first gateway 112A. The base stations 120A and 120B may be Evolved Node Bs (eNodeBs), Base Transceiver Stations (BTSs), or the like, and the UEs 122A to 122E may be cellular phones, wireless hotspots, computers with cellular modems, or the like, but embodiments are not limited thereto.

The IAN 106 includes a shared wired resource 108 (for example, a coaxial cable, fiber optic cable, or the like, or combinations thereof) connecting a plurality of Local Area Networks (LANs) 130A and 130B to the second gateway 112B. Devices on the LANs 130A and 130B may compete for the finite bandwidth of the shared wired resource 108.

A first LAN 130A may include a combined modem and router 132 for connecting devices on the first LAN 130A to the WAN 102 through the shared wired resource 108. A plurality of networked devices 134A, 134B, and 134C may be connected to the combined modem and router 132 by, for example, 1000Base-T Ethernet over copper wires.

A second LAN 130B may include a combined modem, router, and wireless Access Point (AP) 136 for connecting devices on the second LAN 130B to the WAN 102 through the shared wired resource 108. The second LAN 130B may therefore be a Wireless LAN (WLAN). A plurality of stations (STAs) 138A, 138B, and 138C may be wireless connected to the combined modem, router, and AP 136 using, for example, Wi-Fi™ technology using a shared radio-frequency resource.

First and second servers 114A and 114B may provide services to devices connected to the WAN 102. Examples of services that may be provided include cloud computing, cloud storage, social networking, streaming video, and the like. Each of the first and second servers 114A and 114B may deliver a particular type of content. For example, the first server 114A may be a dedicated video-on-demand server, in which case traffic coming from the server 114A may be presumed to be video traffic.

FIG. 2 illustrates communication protocol stacks pertinent to some embodiments. On the left is the Open System Interconnect (OSI) protocol stack model (hereinafter, OSI stack), having 7 layers, and a Transmission Control Protocol/Internet Protocol (TCP/IP) protocol stack model (hereinafter, TCP/IP stack) having four layers. The lowest two levels of the OSI stack (Physical and Datalink) correspond to the lowest level (Ethernet) of the TCP/IP stack, and the highest three layers of the OSI stack (Application, Presentation, and Session) correspond to the Application layer of the TCP/IP stack.

The Physical layer of the OSI stack deals with the physical connectors and electrical specification of signals, and corresponds to the medium over which the digital signals are transmitted (e.g., twisted pair, coaxial cable, optical fiber, wireless, et cetera).

The Datalink layer of the OSI stack handles the transformation of raw bits of the physical layer to and from logical structured packets for data (that is, frames) and for transferring frames from one host to another.

The Ethernet layer of the TCP/IP stack provides the functionality of both the Physical and Datalink layers of the OSI stack.

The Networking layer of the OSI stack handles transferring data between systems in a network (that is, end-to-end transfers) using network-layer addresses of machines to designate destinations and sources. Routers operate at this level to manage and direct traffic. The IP level of the TCP/IP stack provides this functionality.

The Transport layer of the OSI stack transfers data between source and destination processes running on systems. Generally, two connection modes are recognized, connection-oriented and connectionless.

Connection-oriented mode establishes a dedicated virtual circuit and offers various grades of guaranteed delivery, ensuring that data received is identical to data transmitted. The TCP of the TCP/IP stack corresponds to a connection-oriented Transport layer mode.

Connectionless mode provides only best-effort service without the built-in ability to correct errors, which includes complete loss of data without notifying the data source of the failure. No logical connection, and no persistent state of the transaction exists between the endpoints, lending the connectionless mode low overhead and potentially better real-time performance for timing-critical applications such as voice and video transmissions. The UDP of the TCP/IP stack correspond to a connectionless Transport layer mode.

The Session layer of the OSI stack controls the connections between computers. It may establish, manage, and terminate connections between local and remote applications, and provide for full-duplex, half-duplex, or simplex operation, among other functions. The Presentation layer of the OSI stack defines and encrypts/decrypts data types from the application layer, and may include protocols such as JPEG, MPEG, and GIF. The Application layer of the OSI stack keeps track of how each application talks to another application, and may link destination and source addresses to specific applications. The Application layer of the TCP/IP stack corresponds to the functionality of the Session, Presentation, and Application layers of the OSI stack.

FIG. 3 illustrates a data transfer in a communication network 300 according to an embodiment. In the illustrative example of FIG. 3, information flows between a UE 304 and a server 308 through a router 306 and a gateway 310, but embodiments are not limited thereto, and typically, the UE 304 communicates with the server 308 through at least one gateway 308 and a plurality of routers 306.

In FIG. 3, a base station 302 of a RAN 318 provides wireless communications to the UE 304, and provides congestion-related information 316 of the RAN 318 to the gateway 310. In an embodiment, other nodes, e.g., adjacent base stations or nearby UEs, may also provide the congestion-related information provided to the gate way 310; alternatively, the gateway 310 may obtain the congestion-related information from its internal mechanism or process running therein. The congestion-related information 316 may include real-time transport congestion metrics. For example, the base station 302 may be an eNodeB of RAN 318, and may supply congestion metrics related to all of the data transport sessions being served by the eNodeB.

The real-time transport congestion metrics included in the congestion-related information 316 may one or more of a number of users currently sharing the transport network, a real-time throughput of each user; a delay incurred in processing a data packet due to overburdening due to excess resource demand (that is, congestion), a Channel Quality Indicator (CQI) of a radio environment; user information for the origin and destination of the data transport session, and priority levels of data transport sessions. However, embodiments are not limited thereto.

The information flowing from and to the UE 304 may be processed by all seven layers of the OSI stack (or the equivalent TCP/IP layers) in the UE 304, and may be processed by all seven layers of the OSI stack (or the equivalent TCP/IP layers) in the server 308.

In the router 306, the information flowing from and to the UE 304 may only be processed by the bottom three layers the OSI stack (or the Ethernet and IP layers of a TCP/IP stack). For example, the router 306 may process the packets flowing through it using information in the IP headers of the packets without using the information encoded in the IP data of the packets.

In contrast, in the gateway 310, the packets may be processed according to information in headers of the Transport layer 314, which headers are included in the data of the Network layer frames. For example, the gateway 310 may process the packets according to TCP or UDP headers included in the IP data of an IP frame. Furthermore, the gateway 310 may alter the Transport layers 314 headers, and may do so according to the congestion-related information 316.

The gateway 310 may receive congestion-related information 316 from one or more other network nodes, in addition to receiving such from the base station 302.

In an embodiment, the gateway 310 includes a transport optimization process 312 that provides network management functions by interpreting and altering headers in Transport layer 314 in response to the congestion-related information 316. In embodiments, the gateway 310 may perform the network management functions according to transport congestion protocols stored in the gateway 310 or in an external database. The network management functions may be performed on a data transport session basis. The network management functions may include controlling a packet rate (and therefore a bandwidth) used by the data transport session in order to prevent congestion on the network.

In an embodiment, the gateway 310 is part of a border traffic aggregation point connecting the RAN 318 with a WAN. For example, in a 3rd Generation Partnership Project (3GPP) standard mobile network, the aggregate point is part of the sGi-LAN connecting to the Packet Data Network (PDN)-Gateway core element and outwards to the Internet. In another embodiment, the aggregate point is part of a Gi-LAN connecting to a gateway GPRS support node (GGSN)-Gateway and outwards to the Internet. However, in other embodiments, the gateway 310 is located elsewhere.

In an embodiment, a device implementing a congestion aware transport optimization solution such as the transport optimization process 312 could be deployed directly in line with the data transport session, as shown in FIG. 3. In another embodiment, a device implementing the transport optimization process 312 could be out of the path carrying the data transport session, in which case the device may send and receive control messages to and from other network elements to accomplish the desired transport optimization.

In some embodiments, the gateway 310 may be part of a content delivery network serving one or more networks including the RAN 318. According to various embodiments, the gateway 310 may be located at a network node or endpoint between (or including) the UE 304 and the server 308.

In embodiments, the gateway 310 may be located at a base station, a base station controller, or an access point serving one or more user devices including the UE 304.

In an embodiment, the transport optimization process 312 performs the network management function according to an application or type of application associated with the data transport session. For example, when a data transport session is determined to be connection to a dedicated video-on-demand server, the transport optimization process 312 may use a fair-share policy specific to video streams to perform the network management function.

In an embodiment, when the transport optimization process 312 receives no congestion-related information 316 pertinent to a data transport session (such as when no congestion aware transport node exists or a congestion aware transport node is unable to send congestion-related information to other network nodes) then the transport optimization process 312 may implement its own congestion detection method.

Regardless of whether the congestion-related information is delivered from an external node or derived internally, the transport optimization process 312 maintains and updates a cache of congestion information as it relates to diverging paths in the transport network. While data transport sessions may have common aggregation points, there are often diverging paths throughout the network which could constitute different congestion profiles and therefore require distinction by the transport optimization solution.

For data transport sessions that use TCP, the transport optimization process 312 may query a congestion Key Performance Indicator (KPI) cache to find the appropriate starting congestion window sizing, which controls how quickly the data transport session should start sending packets to quickly obtain its fair-share of the transport network resources. As the transport optimization process 312 continues to optimize the data transport session, it is also receiving or deriving updated congestion metrics and continuously updating the data transport session's transmit rate to be commensurate with the level of congestion.

For TCP data transport sessions that exist in congested transport networks, the fair-share window could be held at a rate that is appropriate for the level of congestion. For example, if a 10 Mbps transport link is moderately congested (~50%) by 5 concurrent data transport sessions, the transport optimization process 312 could quickly set the transport throughput to each data transport session's fair-share of the transport networks capability. In contrast, traditional competing TCP data sessions that have not been optimized may increase the congestion on the transport network by continuously trying to increase their transport speed, essentially fighting each other to achieve individual maximum throughput.

In the case of UDP transport protocols that implement a fair-share algorithm as part of their protocol stack (i.e. the Quick UDP Internet Connection (QUIC) protocol) the congestion aware transport optimization process 312 could perform the previously described deceleration technique as an over the top management protocol. When a fair-share UDP data session is established in a congested transport network, the transport optimization process 312 could reduce the rate at which the data transport session is able to transmit, continuously updating the allowed transport rate based on the real-time transport congestion metrics.

Figure 4:
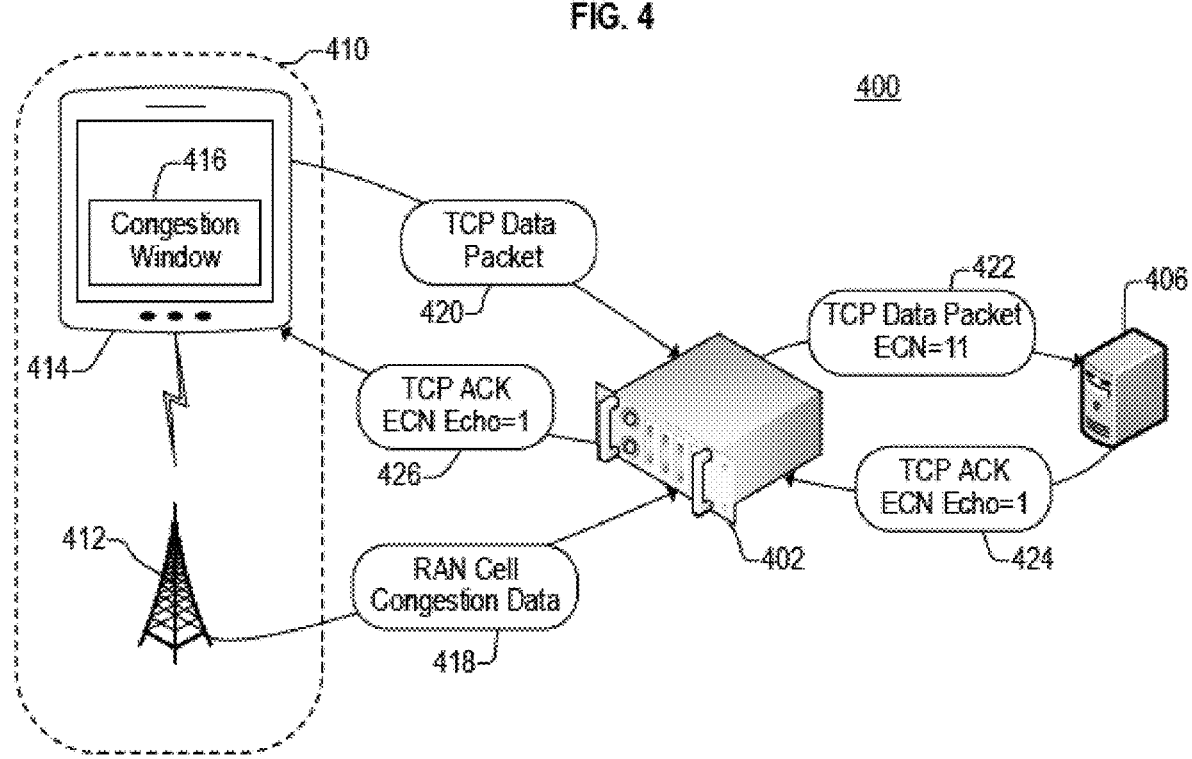
FIG. 4 illustrates operation of a transport optimization system according to an embodiment.

FIG. 4 illustrates operation of a transport optimization system 400 according to an embodiment. The transport optimization system 400 includes a gateway 402, a server 406, and a RAN 410. The RAN 410 includes a base station 412 that provides data communications to a UE 414.

The base station 412 provides congestion-related data 418 for the RAN 410 to the gateway 402. The congestion-related data 418 may include one or more of information on throughput, latency, round-trip time, jitter, distribution of traffic types (such as numbers of short and long packets), and number of competing concurrent flows. In an embodiment, the gateway 402 may add additional information to the received congestion-related data 418, such as congestion information regarding individual links between the gateway 402 and other devices, and congestion information regarding other parts of the network.

The UE 414 may transmit, through the RAN 410, a first TCP Data packet 420 to the gateway 402 as part of a data transport session. The first TCP Data packet 420 is intended for delivery to the server 406. The gateway 402 may determine, using a congestion protocol associated with the data transport session and the congestion-related data 418, that the bandwidth used by the data transport session should be reduced.

In an embodiment, in response to determining that the bandwidth used by the data transport session should be reduced, the gateway 402 modifies the first TCP Data packet 420 by setting Explicit Congestion Notification (ECN) bits in the TCP header to '11' to produce a second TCP data packet 422. The second TCP data packet 422 is then routed to the server 406.

In response to the second TCP data packet 422, the server 406 transmits a first Acknowledgement (ACK) 424 intended for delivery to the UE 414. The first ACK 424 includes an ECN Echo (ECE) bit set to 1.

The gateway forwards the first ACK 424 to the UE 414 as a second ACK 426 that is identical, at the TCP level, to the first TCP Ack 424.

In response to receiving the second TCP ACK 426 having the ECN Echo bit set to 1, the UE 414 reduces a size of a congestion window 416 associated with the data transport session, thus decreasing the packet rate (and therefore the bandwidth) of the data transport session.

Figure 5:
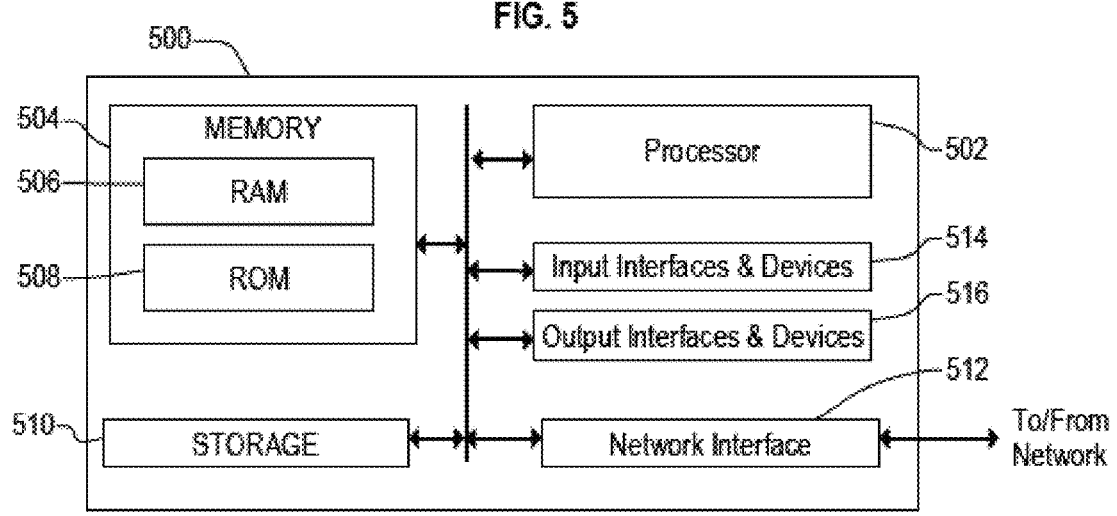
FIG. 5 illustrates a computer system according to an embodiment.

FIG. 5 illustrates a computer system 500, which may be used to implement an embodiment. The computer system 500 may implement an embodiment by, for example, executing computer programming instructions stored in a non-transitory computer readable medium.

The computer system 500 may include one or more of a processor 502, a memory 504, input interfaces and devices 514, output interfaces and devices 516, and a storage 510, each of which communicates with each other through a bus, fabric, or other interconnect technology.

The computer system 500 may also include one or more network interfaces 512 coupled to a network. For example, when the computer system 500 is used to implement a router or gateway, the computer system 500 may include a network interface 512 for each physical layer network connection of the computer system 500.

The processor 502 may be a central processing unit (CPU) or a semiconductor device that executes processing instructions stored in the memory 504 and/or the storage 510. The memory 504 and the storage 510 may include various forms of volatile or non-volatile storage media. For example, the memory 504 may include a read-only memory (ROM) 508 and a random access memory (RAM) 506, and the storage may include a Hard Disk Drive (HDD), a Solid State Drive (SSD), or the like.

Figure 6:
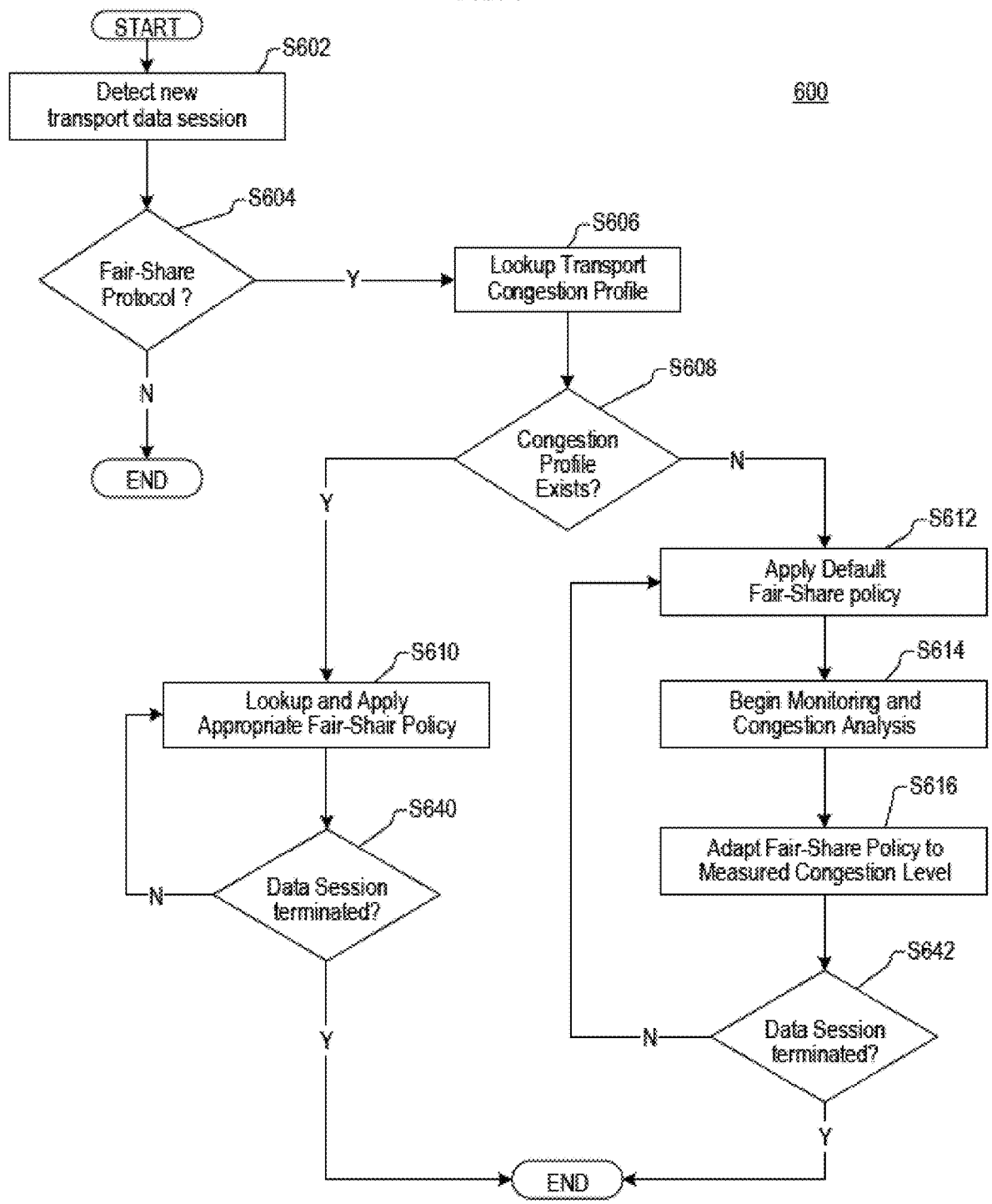
FIG. 6 illustrates a process using congestion information for transport optimization according to an embodiment.

FIG. 6 illustrates a process 600 using congestion information for transport optimization according to an embodiment. The process 600 may be performed in a transport optimization system, such as the transport optimization system 400 of FIG. 4, and in particular by a traffic manager in such a system. The process 600 implements congestion aware fair-share bandwidth control using a transport congestion profile lookup. Embodiments of the transport optimization process 312 of FIG. 3 may include the process 600.

At S602, the process 600 detects a new data transport session. The data transport session may be, for example, a TCP session initiated by a user device (such as the UE 414 of FIG. 4) and connecting the user device to a server (such as the server 406 of FIG. 4). However, embodiments are not limited thereto.

The process 600 may detect the new data transport session by monitoring transport-level packets. For example, the process 600 may detect a new TCP data transport session by detecting a TCP "three-way handshake" consisting of SYN, SYN+ACK, and ACK messages. In the case of a TCP data transport session, the process 600 may determine whether a message is associated with the data transport session using the source and destination addresses in the IP header of the message and the source and destination ports in the TCP header of the message.

The process 600 may also detect, for example, UDP and QUIC data transport sessions, and the like. In embodiments, the process 600 may detect data transport sessions of any Transport layer protocol.

At S604, the process 600 determines whether the detected data transport session is of a fair-share protocol. For example, TCP and QUIC are fair-share protocols, and UDP is not a fair share protocol. When the detected data transport session is not a fair-share protocol, at S604 the process 600 exits; otherwise, the process 600 proceeds to S606.

At S606, the process 600 performs a lookup to determine whether there is a transport congestion profile applicable to the data transport session. The process 600 may perform the lookup for a transport congestion profile of a particular subnetwork (such as the RAN 410 of FIG. 4, or one of the RANs 104A and 104B and the IAN 106 of FIG. 1) of which an endpoint of the data transport session is a member.

For example, when the UE 414 of FIG. 4 is an endpoint of the data transport session, the process 600 may look up and select a transport congestion profile in a database of transport congestion profiles for the RAN 410 of FIG. 4 that the user equipment 414 is a member of. In another example, when the network device 134A of FIG. 1 is an endpoint of the data transport session, the process 600 may look up and select a transport congestion profile in a database of transport congestion profiles for the IAN 106 of FIG. 1.

At S608, when an applicable transport congestion protocol is found at S606, the process 600 proceeds to S610; otherwise, the process 600 proceeds to S612.

At S610, the process 600 looks up and selects the appropriate fair-share policy applicable to the data transport session and, using the output of the transport congestion protocol selected at S606, apply the fair-share policy to the data transport session. The process 600 then proceeds to S640.

Applying the fair-share policy may include controlling a bandwidth used by the data transport session by in-band or out-of-band signaling. For example, the process 600 may control the bandwidth of the data transport session by modify a TCP data packet of the data transport session by setting ECN bits of the TCP packet to '11,' as shown in FIG. 4. In another example, the process 600 may control the bandwidth of the data transport session by modifying an ACK message of the data transport session by setting am ECN Echo bit of the ACK message to '1.'

The process 600 takes advantage of the additional information available to it, compared to congestion management solutions of the related arts. As a result, some indications that would be considered indications of congestion by solutions of the related arts may not be considered indications of congestion by the process 600, and some indications that the solutions of the related arts have no awareness of may be considered indications of congestion by the process 600. The process 600 may therefore perform congestion-related adjustments dynamically in real time based on current conditions in the network.

For example, when a packet latency of a RAN increases from 16 ms to 90 ms because of temporary interference, a congestion management solution of the related arts may consider that congestion and adjust its congestion window accordingly. In contrast, in an embodiment of the process 600, an increase in latency caused by temporary interference would not necessarily be considered an indication of congestion, and would therefore not necessarily cause an adjustment to a congestion window, but an increase in latency associated with an increase in a number of simultaneous users (and therefore an increase in the amount of data being transmitted) would be considered an indication of congestion, and could cause an adjustment of one or more congestion windows. In this way, the process 600 distinguishes between variations in performance indications that are acceptable normal variations and not due to congestion, and variations in performance indications and in combinations of performance indications that reliably indicate congestion.

At S612, in response to no transport congestion profile being found at S608, the process 600 creates a transport congestion profile based on a default fair-share policy. The process 600 may then store the created transport congestion profile in an appropriate database. For example, when a data transport session has a user device in a RAN as an endpoint, the process 600 may store the created transport congestion profile in a database of transport congestion profiles for the RAN.

At S614, the process 600 begins monitoring traffic related to the created transport congestion profile, and performing congestion analysis to determine a pertinent congestion level.

At S616, the process 600 adapts the created transport congestion profile according to the congestion level determined at S614. Typically, no two sessions are identical because there are many variables that impact a single transport session. Accordingly, the appropriate congestion profile needs to be adopted for each transport session based on information about the larger transport network and the information measured about each session. For example, two sessions on the same eNodeB cell site can have two different TCP congestion profiles due to their signal strength to the cell site. That is, each of these sessions will be provided with different congestion profiles that are adopted to its own conditions even though the two sessions are on the same cell site. The process 600 then proceeds to S642.

At S640, the process 600 determines whether the data transport session has been terminated. When the data transport session has been terminated, the process 600 ends; otherwise the process 600 proceeds to S610.

At S642, the process 600 determines whether the data transport session has been terminated. When the data transport session has been terminated, the process 600 ends; otherwise the process 600 proceeds to S612. In an embodiment, when a session ends (e.g., at S640 or S642), the congestion profile of that session is added to database for use by subsequent sessions.

Figure 7:
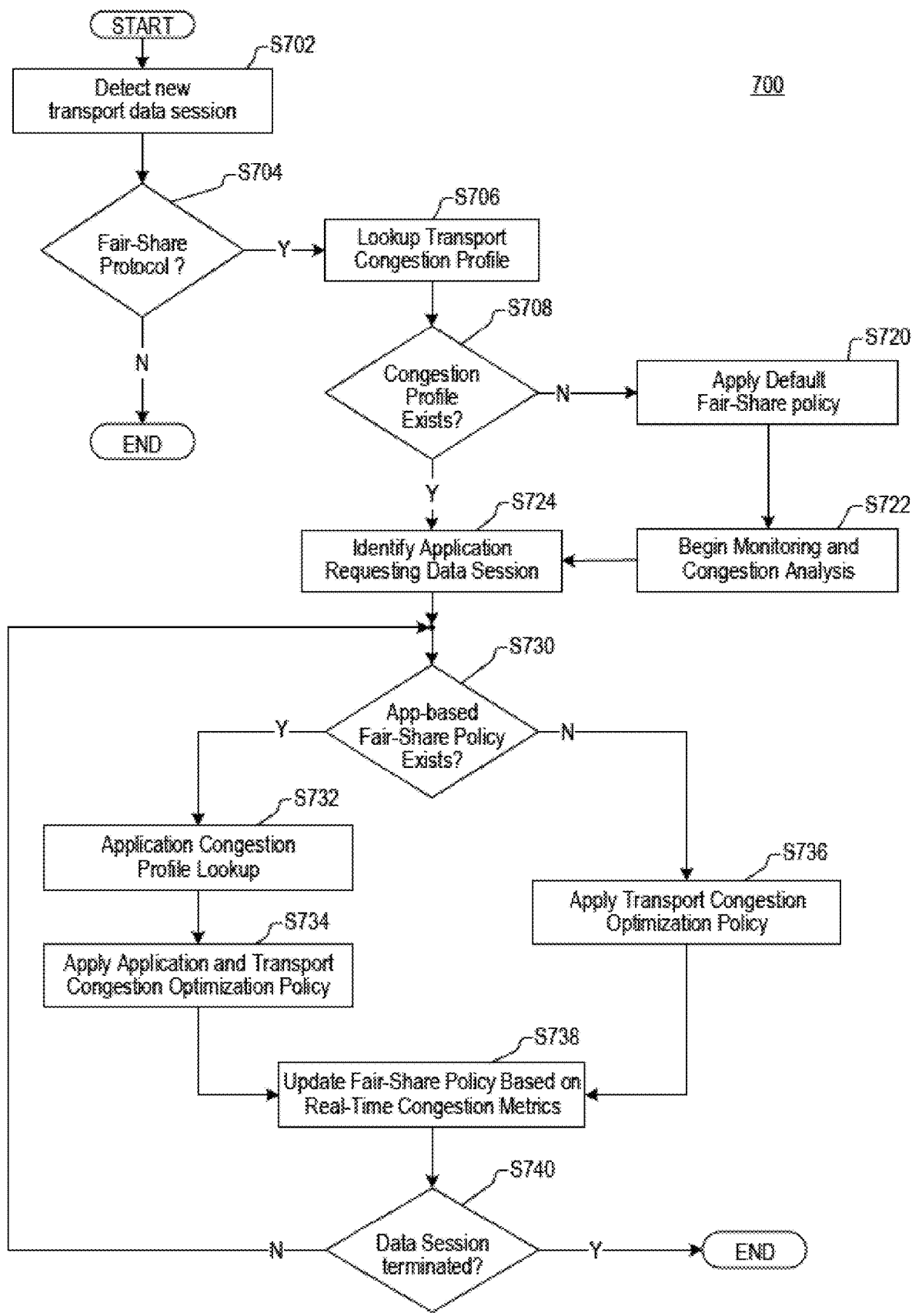
FIG. 7 illustrates a process using congestion information for transport optimization according to another embodiment.

FIG. 7 illustrates a process 700 using congestion information for transport optimization according to another embodiment. The process 700 is both application and transport network congestion aware; that is, when managing a data transport session, it considers both the current level of congestion in the network being traversed by the data transport session and the application using the data transport session. Embodiments of the transport optimization process 312 of FIG. 3 may include the process 600.

The process 700 may implement fair-share policies based on both transport network congestion level and the requesting application. For example, if a transport session was established by a YouTube® application using the QUIC protocol, the process 700 could determine the appropriate transmit rate based on application specific requirements and KPIs as well as the transport network's congestion level. If the YouTube QUIC data session traversed a congested network, the process 700 may initially allow faster throughput for the YouTube QUIC data session knowing that video applications like YouTube rely on fast time to first frame to reduce initial buffering time. Then after a certain time or amount of data has been delivered to the application, the process 700 may reduce the data rate of the YouTube QUIC data session to allow other application types to have priority for the channel resources, again relying on the knowledge that video applications like YouTube operate as buffered systems that can tolerate fluctuation in transport network performance without negative impact to the video application.

In an embodiment, the process 700 may prioritize one or more sessions associated with the same network (e.g., the same cell site) based on certain characteristics of these sessions. For example, if there are a plurality of sessions over the same cell site, then the process 700 may temporarily reduce the send rate of one or more of the flows that have been transmitting for an extended duration in order to accelerate the flows of sessions that have been transmitting for less time, or less bytes, or both. This could allow these accelerated sessions to finish their transmission more quickly and reduce contention for the network resources at the cell site, thereby increase the available network resources to the larger more persistent sessions. In an implementation, the process 700 prioritizes the one or more sessions for accelerated flows if the plurality of the sessions is causing network transmission delay over the same cell site due to cross-traffic contention.

In an embodiment, the process 700 may determine the kind of application from the IP address of an endpoint of the data transport session. For example, a data transport session having an IP address associated with a YouTube® video server as an endpoint may be considered to be carrying data for an on-demand video application, while a data transport session having an IP address associated with a World of Warcraft® server as an endpoint may be considered to be carrying data for an online real-time game application.

The actions performed by the process 700 at S702, S704, and S706 correspond to the actions performed by the process 600 at S702, S704, and S706, and descriptions thereof will therefore be omitted for brevity.

At S706, the process 700 performs a lookup to determine whether there is a transport congestion profile applicable to the data transport session. The process 700 may perform the lookup for a transport congestion profile of a particular subnetwork of which an endpoint of the data transport session is a member, as described for S606 of FIG. 6.

As S708, when an applicable transport congestion protocol is found at S706, at S708 the process 700 proceeds to S724; otherwise, at S708 the process 700 proceeds to S720.

At S720, the process 700, in response to no transport congestion profile being found at S708, the process 700 creates a transport congestion profile based on a default fair-share policy. The process 700 may then store the created transport congestion profile in an appropriate database. For example, when a data transport session has a user device in a RAN as an endpoint, the process 700 may store the created transport congestion profile in a database of transport congestion profiles for the RAN.

At S722, the process 700 begins monitoring traffic related to the created transport congestion profile, and performing congestion analysis to determine a pertinent congestion level. In an embodiment, S722 is performed for a session where a congestion policy is not already known in advance. The characteristics of the session is measured to determine its the congestion level and decide on an appropriate action to reduce the congestion level.

At S724, the process 700 identifies an application responsible for the data transport session. The process 700 may identify the application by, for example, performing a reverse Domain Name Service (DNS) lookup on an IP address of an endpoint of the data transport session, by examining the contents of the data carried in the data transport session, or by recognizing a known pattern of behavior of an application.

At S730, the process 700 determines whether an application specific fair-share policy exists for the application identified at S724. If no application was identified at S724, the process 700 determines that an application-specific fair-share policy does not exist for the data transport session. If an application was identified at S724, the process 700 checks a database of application-specific fair-share policies to determine whether one exists for the determined application.

In an embodiment, the database of application-specific fair-share policies may be specific to a subnetwork or type of subnetwork; for example, a first database of such polices may exist for RANs, and a second database of such polices may exist for cable IANs. The database used may be determined by a type of a subnetworks carrying the data transport session or associated with an endpoint of the data transport session.

When the process 700 determines that an application-specific fair-share policy does not exist for the data transport session, as S730 the process 700 proceeds to S736; otherwise the process 700 proceeds to S732.

At S732, the process 700 looks up an application congestion profile corresponding to the application identified at S724.

At S734, the process 700, the process 700 looks up and selects the appropriate fair-share policy applicable to the application determined at S724 and, using the output of the transport congestion protocol selected at S706, apply the fair-share policy to the data transport session. The process 700 then proceeds to S738.

At S736, the process 700 looks up and selects the appropriate fair-share policy applicable to the data transport session and, using the output of the transport congestion protocol selected at S706, apply the fair-share policy to the data transport session. The process 700 then proceeds to S738.

At S738, the process 700 updates the transport congestion profile based on real-time congestion metrics since network conditions are continually changing, and thus the congestion profile needs to be updated based on information from new flows on the same network.

At S740, the process 700 determines whether the data transport session has been terminated. When the data transport session has been terminated, as S740 the process 700 ends; otherwise the process 700 proceeds to S730.

As used herein, a 'subscriber' refers to UE that is subscribed to the system. A 'channel' refers to a wireless communication channel, such as a cell of a wireless network. A cell may correspond to a carrier (that, an operating bandwidth, such as a bandwidth associated with a 600 MHz, 700 MHz, 850 MHz, 1700/2100 MHz, 1900 MHz, 2300 MHz, or other carrier frequency) of a sector of an eNodeB; for example, an eNodeB having three sectors and supporting 850 and 39,000 MHZ carriers in each sector would have six cells, each with a unique identifier. The unique identifier of the cell may be an Evolved UMTS Terrestrial Radio Access (E-UTRAN) Cell Identifier (ECI) or E-UTRAN Global Cell Identifier (ECGI).

U.S. patent application Ser. No. 16/363,749, titled COORDINATED DATA SHARING IN VIRTUALIZED NETWORKING ENVIRONMENTS, filed Mar. 25, 2019, and published as US Pub. No. 2019/0296991 A1, provides techniques for discovering the relations between an endpoint of a data session (as indicated by an IP address) and a location (e.g., a cell, as identified by an ECI or ECGI) of that endpoint within the network. As disclosed therein, messages on a control interface (such as an S1-MME interface of a 4G LTE wireless network) may be monitored to determine a mapping between IP addresses used in data sessions and an identifier (e.g., an ECI) indicating a portion of the wireless network, that is, a cell. The mappings are stored in a mapping database, and updated as UEs move within the network and as data sessions are initiated and terminated. Data sessions may then be analyzed to determine data session analytics. The data session analytics may include data session throughput, size, latency, and IP addresses of the data session. The information in the mapping database may be used to add identifiers of a part of the wireless network (for example, ECIs identifying a cell) to the data session analytics. The ECI-tagged data session analytics may then be used as samples in embodiments of the present disclosure.

Figure 8:
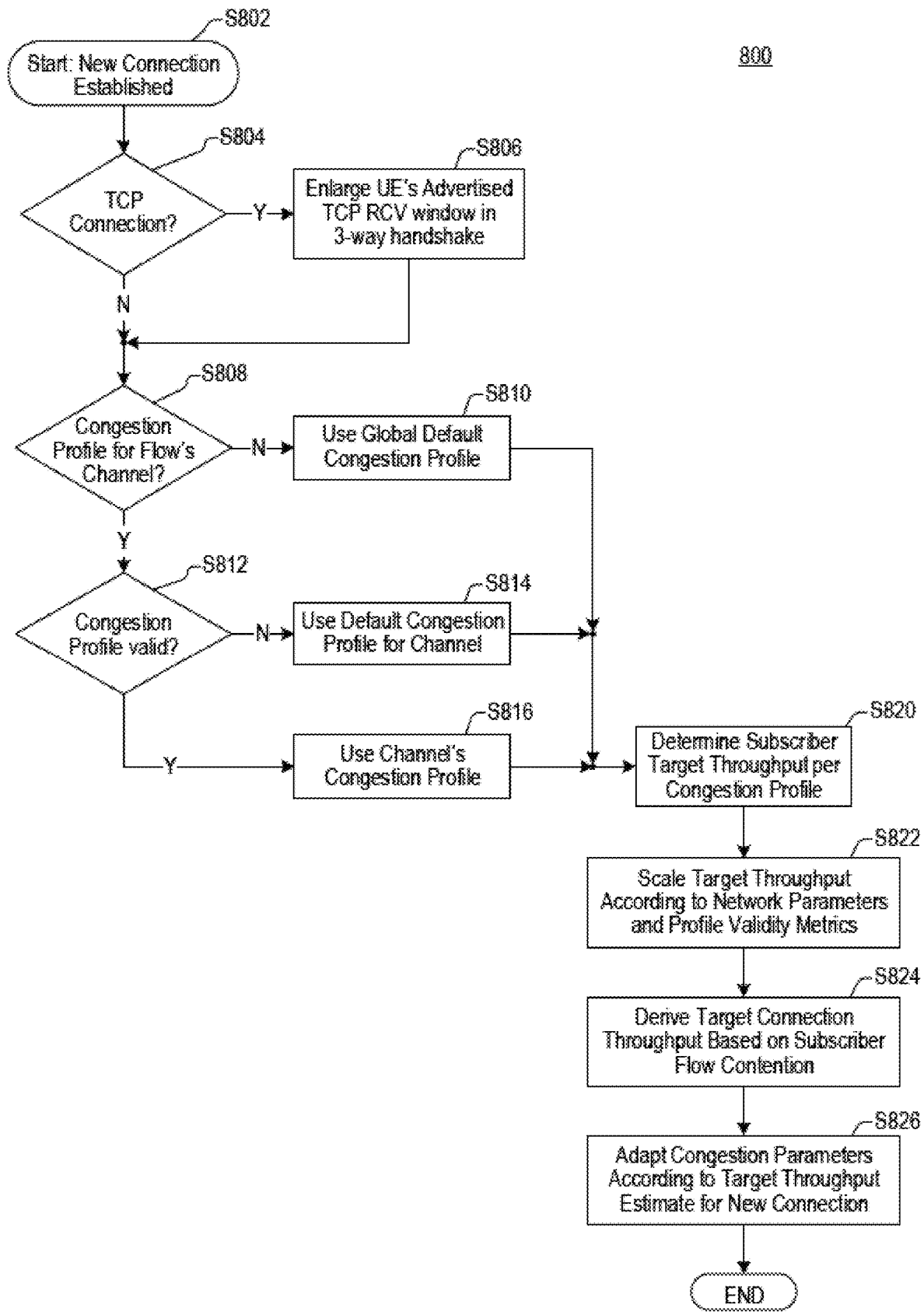
FIG. 8 illustrates a process for determining initial congestion-related properties of a new connection, according to an embodiment.

FIG. 8 illustrates a process 800 for determining initial congestion-related properties of a new connection, according to an embodiment. The process 800 may be performed using an optimization system such as the transport optimization 312 of FIG. 3, a communication proxy program performed by a UE, or a combination thereof, but embodiments are not limited thereto. The process 800 may operate by scaling an Internet-side receive window of a device, determining an initial congestion window, selecting an initial congestion window algorithm, or combinations thereof.

The process 800 starts at S802 in response to a new connection being requested.

At S804, the process 800 determines whether the connection is a Transmission Control Protocol (TCP) connection. When the connection is determined to be a TCP connection, at S804 the process 800 proceeds to S806; otherwise, the process 800 proceeds to S808.

At S806, the process 800 causes the User Equipment's (UE's) Advertised TCP Window to be effectively enlarged.

In an embodiment, the process 800 effectively enlarges the UE's advertised TCP receive window as part of the TCP 3-way handshake, by receiving, from the UE, a SYN packet intended for another device that is the other endpoint of the transport session of the UE (such as a server). The SYN packet includes the advertised TCP receive window (e.g. an internet-side receive window) of the UE. The process 800 may then scale the advertised TCP receive window in the SYN packet by a configurable factor (for example, 4), and forward the SYN packet including the scaled advertised TCP window to the server. In an embodiment, after the server responds to the SYN packet by sending a SYN/ACK packet to the UE, and the UE responds with an ACK packet, the process 800 may receive the ACK packet from the UE, scale the advertised TCP receive window therein, and send the ACK packet including the scaled advertised TCP receive window to the server.

In an embodiment, subsequent packets from the UE to the server in the transport session may also have their advertised TCP window scaled. Furthermore, an optimization system may buffer and acknowledge packets from the server in the transport session, in accordance with the scaled advertised TCP receive window, for delivery to the UE when the UE is capable of receiving the packets. This allows the optimization system to acknowledge (ACK) data from the server faster than the UE, thereby allowing the system to deliver data to the UE at the rate that is greater than would be possible with the UE's advertised client receive window.

The optimization system may in this manner remove a buffer bottleneck. If the client can receive at a faster rate subsequently, then the system sends the data stored in the optimization system at the faster rate without having to request additional data from the server.

The amount of scaling or additional data requested by the optimization system may be based on the network topology information (e.g., user cell location and target throughput estimate), based on data volume delivery, based on application type, based on the degree of user mobility, based on a static setting, or combinations thereof. That is, the optimization system sets how much more data to ask for from the server dynamically based on the understanding of the network topology as well as other relevant factors.

This provides improved performance compared to a TCP proxy that applies a static setting and does not dynamically adjust the setting, particularly since such a TCP proxy may be ignorant of much of the network topology information (such as a number of users and a number of active users in a shared channel).

After performing S806, the process 800 proceeds to S808.

At S808. the process 800 determines whether a congestion profile exists for a channel being used by the connection. Here a channel may correspond to a cell of a RAN, as identified by an E-UTRAN Cell Identifier (ECI) or E-UTRAN Global Cell Identifier (EGCI). In an embodiment, whether the congestion profile exists may be determined as described in step S606 of process 600 of FIG. 6. In response to determining that a congestion profile exists for the channel being used by the connection, at S808 the process 800 proceeds to S812; otherwise the process 800 proceeds to S810.

In embodiments, a valid congestion profile for a channel may exist only if there has been a sufficient amount of pertinent data available in an immediately preceding interval (such as the last 30 seconds, for example). A sufficient amount of data may correspond to a sufficient number of data samples obtained by monitoring flows (i.e., connections) in the channel.

At S810, the process 800 determines to use a global default congestion profile as the selected congestion profile for subsequent steps of the process 800. The global default congestion profile may be a predetermined congestion profile of the optimization system used when the process 800 does not know what channel the session is being transmitted through, has no information on that channel, or has only stale or invalid information on that channel, where stale information is information older than a predetermined amount of time. In an embodiment, the default congestion profile may include a congestion profile that includes an initial slow start stage. The process 800 then proceeds to S820.

At S812, the process 800 determines whether the existing congestion profile for the channel is valid. In an embodiment, a congestion profile may not be valid if, for example, it is based on too few (or no) recent samples from the channel; that is, if it is stale. In an embodiment, a congestion profile may not be valid if the recent samples from the channel do not satisfy a statistical criteria; for example, if the variance or standard deviation of the samples is too high. In response to determining that the congestion profile for the channel is valid; at S812 the process 800 proceeds to S816; otherwise the process 800 proceeds to S814.

At S814, the process 800 determines to use a default congestion profile for the channel as the selected congestion profile for subsequent steps of the process 800. In an embodiment, the default congestion profile for the channel may be a predetermined congestion profile of the optimization system that may correspond to a type or characteristic (such as a size) of the channel. In an embodiment, the default congestion profile for the channel may be a historical learned profile for the channel. The process 800 then proceeds to S820.

At S816, the process 800 determines to use the existing and valid congestion profile for the channel as the selected congestion profile for subsequent steps of the process 800. The process 800 then proceeds to S820.

At S820, the process 800 uses the selected congestion profile to determine a target throughput for the subscriber (i.e., the subscribed device) making the connection. The target throughput for the subscriber may correspond to a combined target throughput for all the connections that the subscriber has made.

In an embodiment, the subscriber target throughput may be estimated using sampled data from the network, using crowd-sourced data from a plurality of connections that are mapped to a cell (corresponding to a specific ECI or EGCI) from which the UE has initiated the connection, or both.

At S822, the process 800 scales the subscriber target throughput determined at S820 by a scale-up factor. The scale-up factor used in S822 may differ from the scaling factor used in S806 and may be based on network parameters and profile validity metrics. The scale-up factor may be greater than 1, as it has been observed that it is usually better to set a higher initial congestion window than indicated by the fair share rate.

In embodiments, the scale-up factor may be set statically.

In embodiments, the scale-up factor may be modified according to network factors, such as a number of users in the cell or a buffer size of the eNodeB of the cell.

In embodiments, the scale-up factor may be adjusted based on an estimate of accuracy of the target throughput estimate, such as a Target Throughput Estimate Accuracy Metric, wherein a higher throughput estimation accuracy corresponds to a more conservative scale-up factor. The target throughput estimation accuracy may be determined according to the number of active users in the cell, where a larger number of users corresponds to a higher throughput estimation accuracy, and a lower target throughput estimation accuracy therefore corresponds to a lower number of users in the cell; when there is a lower number of users in the cell, there is less competition for the channel, and throughput for the connection will therefore likely be higher.

The target throughput estimation accuracy may also be determined according to a cell size corresponding to bandwidth (e.g., 5 Mhz cell, 10 MHz cell, 20 MHz cell, etc.), wherein a number of users required to establish any given level of accuracy increases with the cell size. For example, an adequate number of users to achieve a good estimate for a 5 MHz cell may not be enough to achieve a good estimate for a 20 MHz cell.

Accordingly, in embodiments, the initial congestion window may be set aggressively so that it is more likely to overshoot than undershoot the optimal congestion window for congestion avoidance, because eNodeBs may have large buffers that may be able to accommodate larger burst of data to the client. Accordingly, in an embodiment, the scale-up factor is configured to overshoot in the initial congestion window.

At S824, the process 800 estimates a target throughput for the connection based on the scaled subscriber throughput target. Accordingly, the process 800 may divide the scaled subscriber throughput target among one or more connections associated with the subscriber to produce a connection throughput target.

At S824, the process 800 sets congestion parameters for the connection according to the selected congestion profile, the target throughput for the connection determined in S824, or both. Setting the congestion parameters may include setting whether a slow start stage is used initially. When a slow start stage is used initially, setting the congestion parameters may include setting a threshold congestion window size for transitioning to the congestion avoidance stage.

Setting the congestion parameters may include setting the initial congestion window. In an embodiment, the initial congestion window size is determined according to the target throughput for the connection divided by a round-trip time for the connection.

Figure 9A:
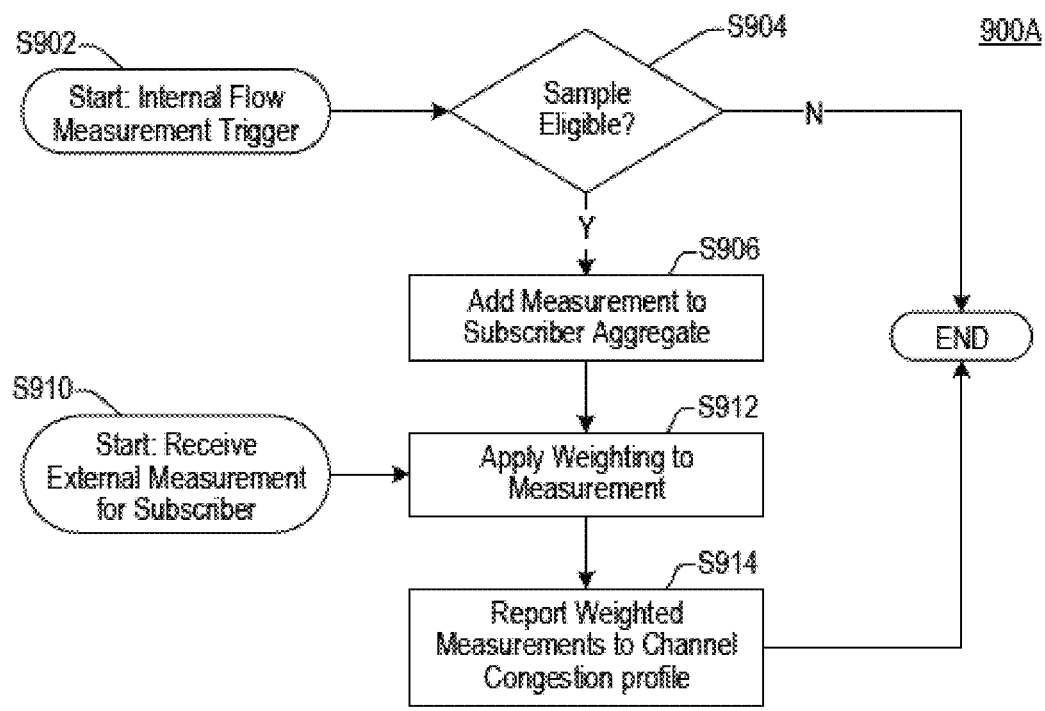
FIG. 9A illustrates a process for congestion profile data acquisition, according to an embodiment.

FIG. 9A illustrates a congestion profile data acquisition process 900A according to an embodiment. The process 900A may be performed using an optimization system such as the transport optimization 312 of FIG. 3.

At S902, a flow measurement trigger occurs. In an embodiment, a flow measurement trigger may occur as a result of a process that periodically monitors and evaluates characteristics (that is, statistics) of the network. The period of the sampling may be configurable. For example, a process may sample a selected set of characteristics every 15 minutes. When one or more statistics satisfy a predetermined criteria, flow measurement may be performed. For example, in an embodiment, a flow measurement may be triggered when a periodically-executed monitoring process detects that average user throughput in a pertinent cell is less than 3 MBps, but embodiments are not limited thereto. When the flow measurement is triggered, a sample of the network characteristics may be taken. Samples may be taken with increased temporal granularity compared to the monitoring that triggered the flow measurement. For example, samples may collect data several times per second instead of once every 15 minutes.

At S904, the process 900A determines whether the sample collected at S902 is eligible for inclusion in the aggregate measurements for a subscriber. Whether a sample is eligible for inclusion may be determined according to, for example, whether the duration of the sample was sufficient, whether the sample is from a burst of an activity, whether the sample was collected while throughput was being limited by the congestion window, how much data was buffered for that sample, whether there were anomalies (such as retransmissions) in the flow during the period when the sample was collected, or combinations thereof, but embodiments are not limited thereto.

When the sample is determined to be eligible, at S904 the process 900A proceeds to S906. When the sample is determined to be ineligible, at S904 the process 900A exits.

At S906, the process 900A adds the eligible sample to an aggregation of samples for subscribers and then proceeds to S912.

In another option for acquiring samples, at S910 the process 900A receives measurements (such as throughput or RTT latency) from external systems that provide more information on current user throughputs.

For example, in embodiments, the process 900A may receive measurements of throughput for large files (such as those carried by elephant flows) from an external system on a second by second basis. These may be very good data samples because they are measured for data sessions that typically demand the full network channel and have larger data bursts.

For another example, in embodiments, the process 900A may receive measurements for UDP-QUIC data sessions. The reception and use of such samples remedies the lack of knowledge of User Datagram Protocol (UDP) and Quick UDP Internet Connection (QUIC) data sessions in the TCP-based initial congestion window algorithm (ICWA).

Upon receiving an external measurement at S910, the process 900A proceeds to S912.

At S912, the process 900A applies respective weightings to the measurements received through S902 and S910. The process 900A the proceeds to S914. In an embodiment, the measurements may be weighted according to probable relevance of the source of the data, such as according to the type of stream (e.g., TCP, UDP, QUIC) the measurements correspond to, the pertinence and/or reliability of an external system providing the measurement, a size of the flow the measurements were taken from, or combinations thereof, but embodiments are not limited thereto. The weights operate to place more importance on measurements that are likely to be reliable indicators of pertinent network conditions.

At S914. the process 900A sends the weighted measurement to a database of measurements used for the congestion profile of the channel (e.g., a cell corresponding to an ECI) from which the measurements originated. In an embodiment, a congestion profile comprises an ECI and a plurality of measurements that are windowed by time. As described elsewhere in this document, a congestion profile may be used to determine an initial congestion window algorithm (ICWA) of a data stream and/or to set one or more parameters of the ICWA.

The database may be an ECI crowd-sourced data database of data collected from sessions in the cell corresponding to the ECI. The database may then be used to, for example, select and parametrize a TCP initial congestion window algorithm in accordance with real-time conditions in the cell.

After reporting the weighted measurement to the database, at S914 the process 900A exits.

Figure 9B:
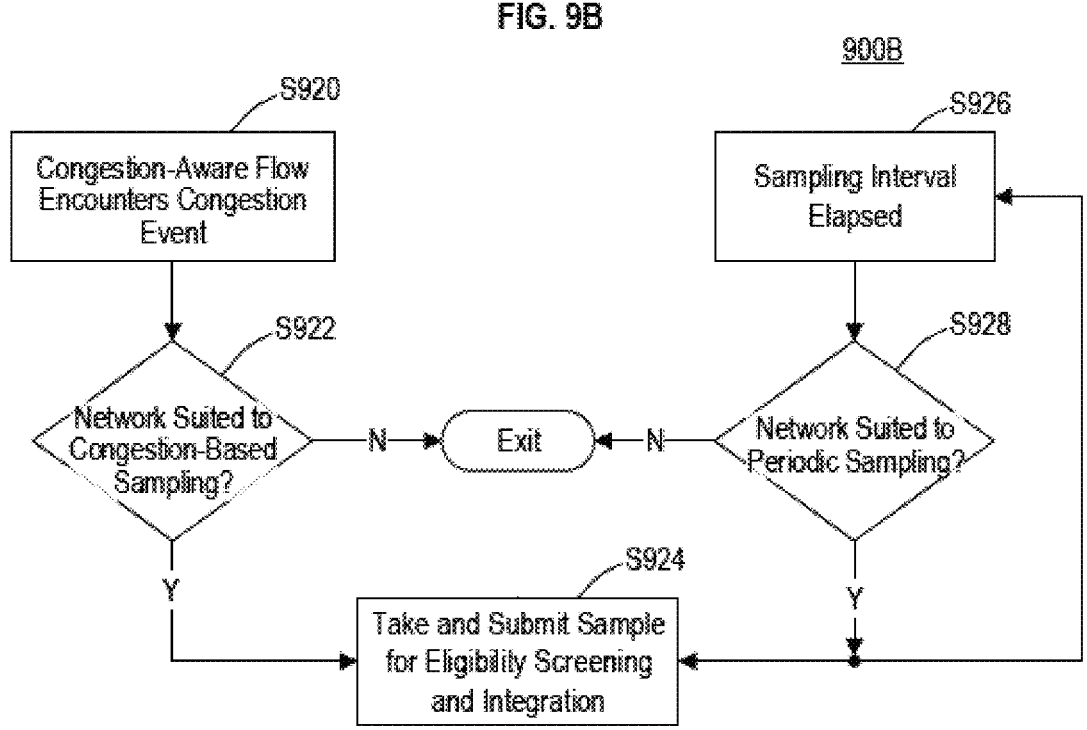
FIG. 9B illustrates a process for performing flow measurements, according to an embodiment.

FIG. 9B illustrates a measurement process 900B according to an embodiment. The process 900B may be used to provide measurements to the process 900A of FIG. 9A, but embodiments are not limited thereto. Each sample may be a periodic sample from among samples taken periodically accordingly to a sampling interval, or a congestion-based sample taken in response to a congestion event.

At S920, the process 900B receives an indication that a data flow for which congestion monitoring is being performed (a congestion-aware flow) has encountered a congestion event. A congestion event may be a retransmission of a lost packet, detection of a spurious retransmission, deflation of a congestion window, reception of a duplicate ACK, or other TCP congestion event, but embodiments are not limited thereto. In response to the indication of the congestion event, the process 900B proceeds to S922.

At S922, the process 900B determines whether the network corresponding to the congestion is suited to congestion-based sampling. Whether a network is suited to congestion-based sampling may be determined, for example, according to a type of the network, a number of UEs active on the network, and a load level of the network. For example, in embodiments, Radio Access Networks (RANs) and other networks that may lose packets for reasons other than congestion, networks with a low number of UEs active on them, and/or networks that are lightly loaded may not be considered suited to congestion-based sampling.

When the network is determined to be suited to congestion-based sampling, at S922, the process 900B proceeds to S924; otherwise the process 900B exits.

At S924, the process 900B takes a sample of measurements of the network and submits the sample to a process (such as, for example, the process 900A of FIG. 9A) for eligibility screening and integration into a database.

At S926, the process 900B receives an indication that a sampling interval has elapsed, which sampling interval may have been initiated after the immediately preceding performance of S926. In response to the indication that the sampling interval has elapsed, the process 900B proceeds to S928.

At S928, the process 900B determines whether the network corresponding to the congestion is suited to periodic sampling. For example, a network may be considered not suited to periodic sampling if congestion-based sampling is sufficient, or if network traffic is sporadic and therefore unlikely to be accurately characterized by periodic sampling.

In embodiments, a network may be suited to both congestion-based and periodic sampling.

When the network is determined to be suited to congestion-based sampling, at S928, the process 900B proceeds to S924; otherwise the process 900B exits.

Figure 9C:
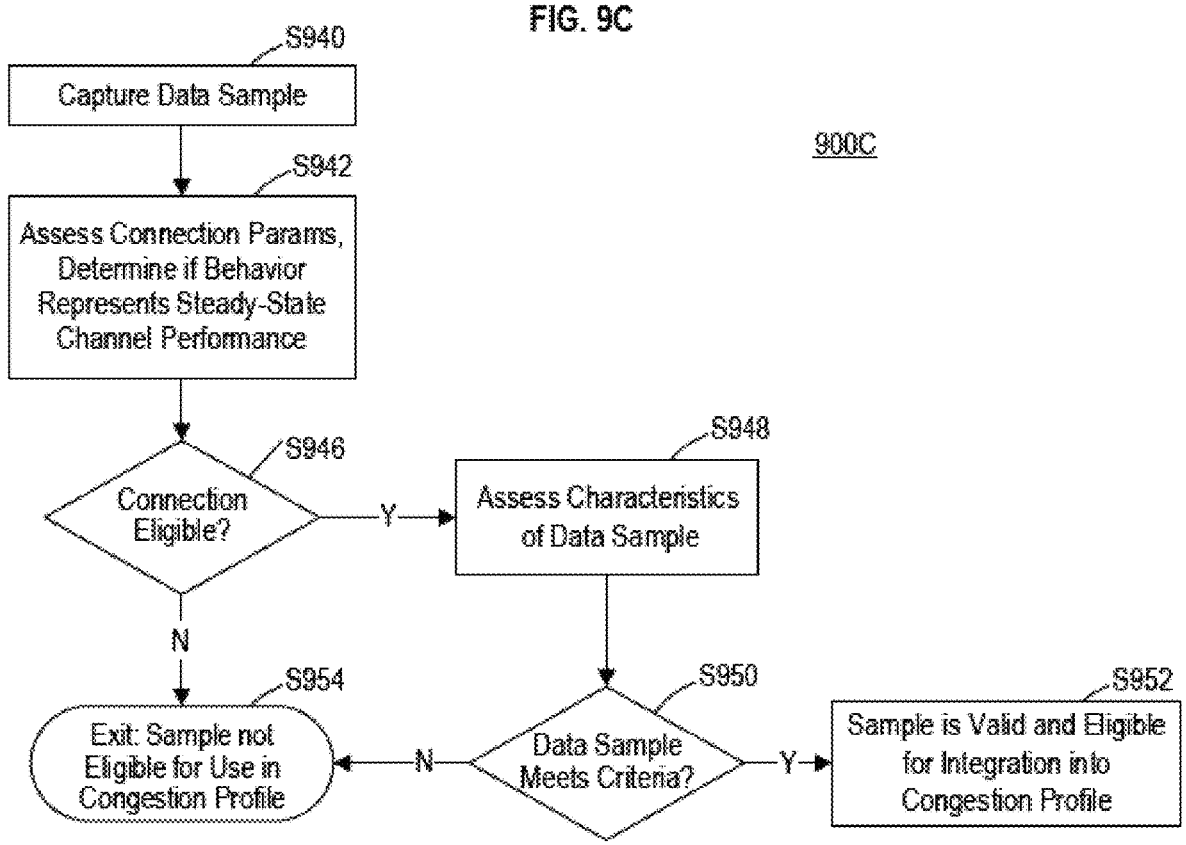
FIG. 9C illustrates a process for determining congestion profile data sample eligibility, according to an embodiment.

FIG. 9C illustrates a process 900C for determining congestion sample eligibility according to an embodiment. The process 900C may be used in S924 of process 900B of FIG. 9B. The process 900C may be performed, for example, by a transport optimizer of a gateway.

At S940, the process 900C captures a data sample from a TCP data stream. The TCP data stream may correspond to a data session.

At S942, the process 900C determines, using connection parameters of the TCP data stream, whether the behavior of the TCP data stream when the data sample was obtained corresponds to steady-state performance of a channel carrying the TCP data stream. Whether the behavior corresponds to steady-state performance may be determined according to the size of the TCP data stream, whether a connection corresponding to the TCP data stream is bottlenecked by a peer's receive window, whether the connection dropped into slow-start, congestion-control algorithm parameters which may vary based on a selected congestion control algorithm, or combinations thereof, but embodiments are not limited thereto.

At S946, the process 900C determines whether the connection corresponding to the TCP data stream is currently eligible to act as a source of data samples. Eligibility of the connection may be determined according to whether the behavior of the TCP data stream when the data sample was obtained corresponds to steady-state performance of a channel carrying the TCP data stream, as determined at S942.

When the connection is eligible, at S946 the process 900C proceeds to S948; otherwise, the process 900C proceeds to S954.

At S948, the process 900C assesses characteristics of the data sample that may be pertinent to whether the data sample is eligible for use in determining a congestion profile for the channel. The characteristics of the data sample assessed at S948 may include an inter-packet time gap, a burst duration, or both, but embodiments are not limited thereto.

At S950, the characteristics assessed in S948 are used to determine whether the data sample is eligible for use in determining the congestion profile. In an embodiment, a data sample may not be eligible when a corresponding inter-packet gap was above a gap duration threshold. In an embodiment, a data sample may not be eligible when a corresponding burst length is below a burst duration threshold.

In an illustrative embodiment, the process 900C may perform steps roughly corresponding to S942 to S950 by:

determining that a TCP connection is eligible for sampling when its congestion avoidance algorithm is in the congestion avoidance stage and the congestion window has increased to the point that a maximum currently available channel throughput (a "bottleneck throughput") is reached, causing a congestion event to occur;

when the connection is eligible, estimating the bottleneck throughput based on the TCP congestion parameters at the time the congestion event occurred (such as a size of the congestion window, a round trip latency of the connection, or both);

determining the validity of the estimated bottleneck throughput according to properties of the TCP connection, such as the size of the TCP data stream, whether the connection is bottlenecked by a peer's receive window, whether the connection dropped into the slow-start stage, a congestion-control algorithm parameter, or combinations thereof; and when the estimated bottleneck throughput is determined to be valid, integrating the estimated bottleneck throughput into a cell congestion profile.

When the data sample is eligible, at S950 the process 900C proceeds to S952; otherwise, the process 900C proceeds to S954.

At S952, the process 900C uses the data sample to create or update a congestion profile for the channel.

At S954, the process 900C exits without using the data sample.

Figure 10:
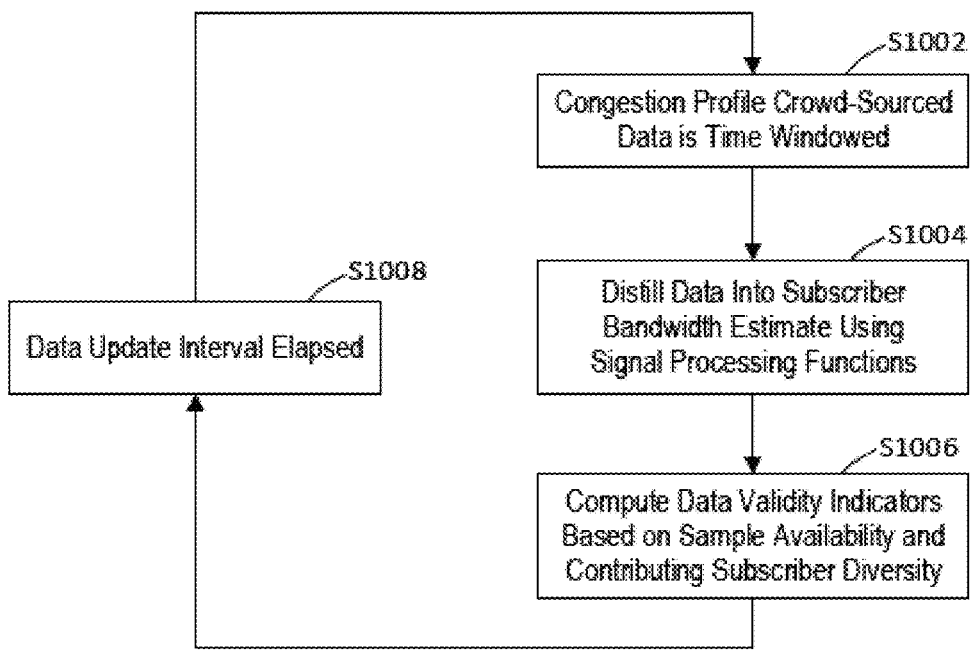
FIG. 10 illustrates a process for determining data validity of a result determined using congestion profile related crowd-sourced data, according to an embodiment.

FIG. 10 illustrates a process 1000 for determining data validity of a result determined using congestion profile related crowd-sourced data, according to an embodiment.

At S1002, the process 1000 restricts the congestion profile related crowd-sourced data according to a time window. For example, the data may be restricted to samples taken in the past 30 seconds. This prevents stale data that may not reflect the current state of the network from being used for the steps that follow.

At S1004, the process 1000 determines an estimated characteristic for a subscriber by applying signal processing functions to the time-windowed crowd-sourced data. The estimated characteristic can be an estimated fair-share bandwidth, an estimated target throughput, or the like. The signal processing may include statistical operations such a computation of a mean, computation of a variance or standard deviation, and the like, but embodiments are not limited thereto.

At S1006, the process 1000 computes data validity indicators for the estimated characteristic for the subscriber. The data validity indicators may include an accuracy metric, such as a target throughput accuracy metric. The data validity indicators may be determined based on a number of samples in the time-windowed crowd-sourced data, a statistical property (such as a variance) of the time-windowed crowd-sourced data, a number of active users represented by samples in the time-windowed crowd-sourced data, a number of active users in a particular cell represented by samples in the time-windowed crowd-sourced data, a number of data sessions represented by samples in the time-windowed crowd-sourced data, a number of data sessions in the particular cell represented by samples in the time-windowed crowd-sourced data, a cell size (which may correlated to a bandwidth of the cell), or combinations thereof, but embodiments are not limited thereto.

At S1008, the process 1000 waits until a data update interval has elapsed, such as a data update interval beginning at the most recent performance of S1002, before proceeding to S1002. In an embodiment, the data update interval may correspond to the interval used to time-window the data in S1002 or a fraction thereof, but embodiments are not limited thereto.

Figure 11:
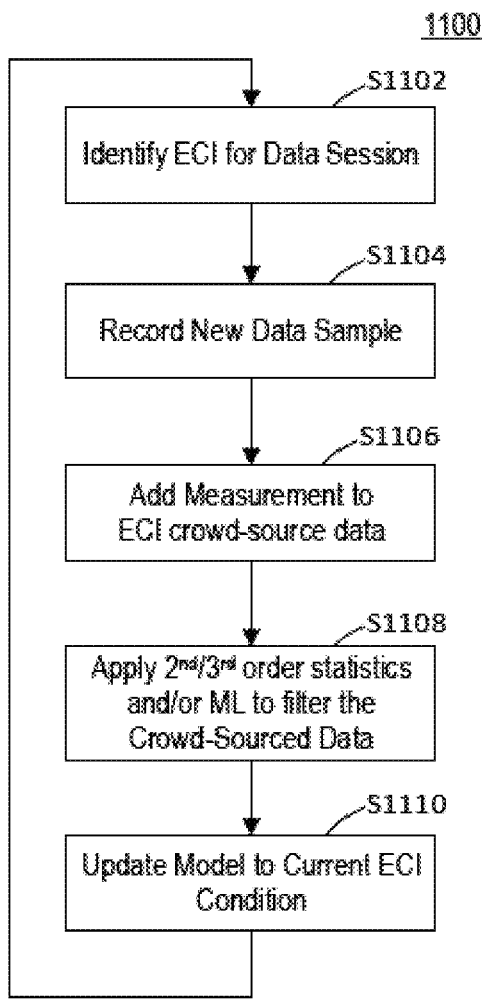
FIG. 11 illustrates a process for acquiring crowd-source data corresponding to a cell identifier, according to an embodiment.

FIG. 11 illustrates a process 1100 for acquiring ECI crowd-source data from a data session, according to an embodiment. The process 1100 may be performed by a gateway including transport optimization functionality, but embodiments are not limited thereto. The process 1100 may apply Machine Learning (ML) clustering techniques to data collected from data sessions in the same cell (crowd-sourced) to create a channel estimation model for each cell. Each data session within a cell contributes to the model (e.g., throughput, latency), allowing real-time model adjustments as cell conditions change. Channel estimate models are created for different conditions within each cell. In an embodiment, a model produced by the process 1100 may be used to determine and set the parameters of an ICWA.

At S1102, the process 1100 determines an identifier (here, an ECI) for a network portion (i.e., a cell) through which the data session is being transported. The ECI may be determined using an IP address corresponding to an endpoint of the data session and a database including mappings between ECIs and IP addresses. The IP address may be an IP address of a UE in the cell.

At S1104, the process 1100 records a new sample from the data session. The sample may include measurements related to channel conditions of the cell identified by the ECI.

At S1106, the process 1100 adds the new sample to a collection of samples for the ECI, herein referred to as crowd-sourced data. The collection of samples may include samples from other data sessions being transported through the cell.

At S1108, the process 1100 may apply second order statistics (such as variance), third order statistics (such as skewness), machine learning, and the like to filter the crowd-sourced data. The filtering may operate to eliminate data that has a high probability of not being representative of the state of the cell. For example, at S1108 the process 1100 may filter out: samples recognized by a trained neural network as outliers, samples that are outside the centroid of a two-dimensional dataset, or samples that are outside a central 95% of a deviation.

After filtering the crowd-sourced data, at S1108 the process 1100 may generate statistical properties (e.g., a mean, variance, and so on) of the samples that were not filtered out.

At S1110, the process 1100 updates an estimation model for the ECI using the results of S1108. The estimation model may include a channel congestion profile for the cell indicated by the ECI.

Figure 12:
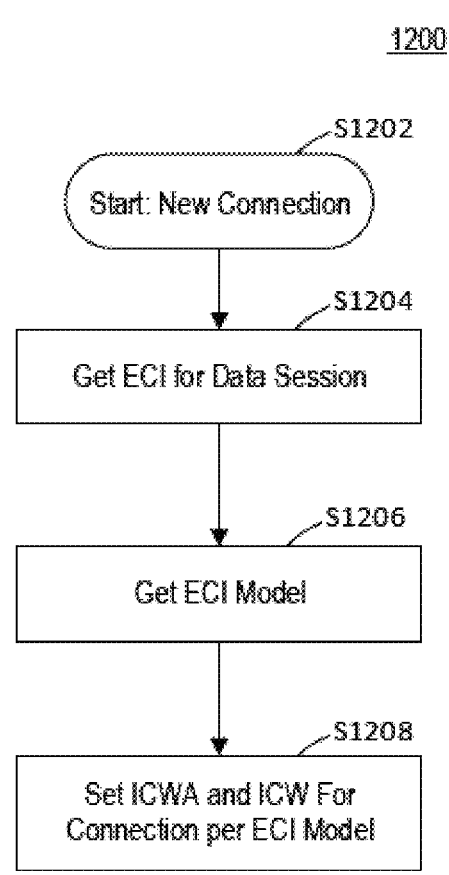
FIG. 12 illustrates a process for determining an initial congestion window algorithm and an initial congestion window for a new connection, according to an embodiment.
Figure 13:
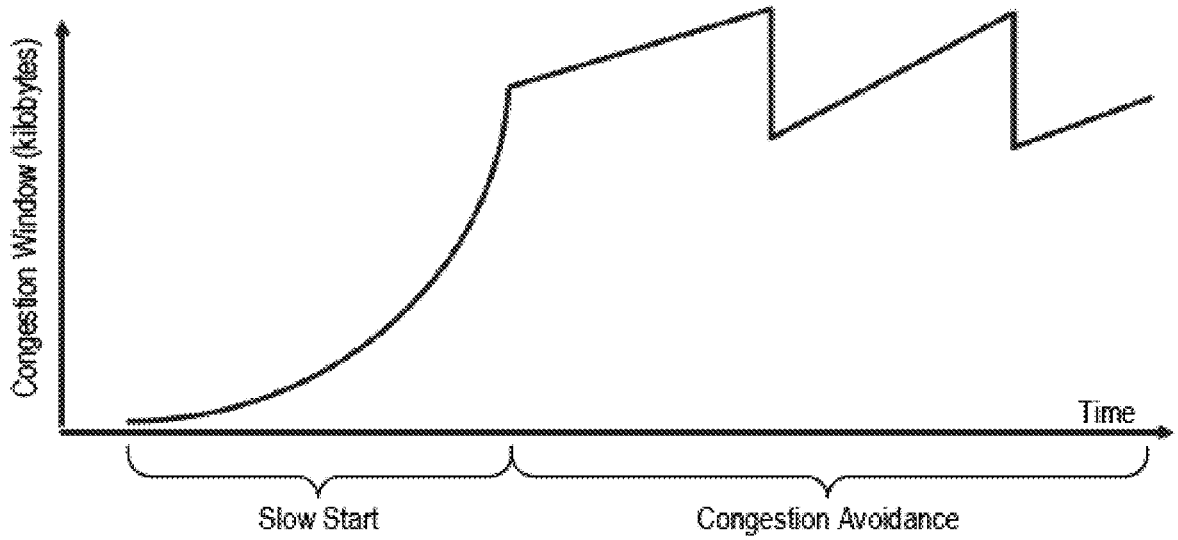
FIG. 13 illustrates a slow start stage and a congestion avoidance stage of a TCP congestion control algorithm.

FIG. 12 illustrates a process 1200 for determining an initial congestion window algorithm (ICWA) and parameters thereof for a new connection, according to an embodiment.

The process 1200 starts at S1202 when a subscriber requests a new TCP connection for a data session.

At S1204, the process 1200 determines the subscriber's current cell and, using an IP address of the subscriber-end endpoint of the data session, determines an ECI corresponding to the new data session.

At S1206, the process 1200 uses the ECI determined in S1204 to obtain a channel estimation model for the cell corresponding to the ECI. The channel estimation model may be a channel estimation model produced using the process 1100 of FIG. 11. The channel estimation model may include a congestion profile for the cell.

At S1208, the process 1200 may determine an ICWA and the parameters of the ICWA to use for the data session. The parameters of the ICWA may include an initial congestion window.

Embodiments may be implemented as a computer implemented method or as a non-transitory computer readable medium with computer executable instructions stored thereon. In an embodiment, when executed by the processor, the computer readable instructions may perform a method according to at least one aspect of the present disclosure.

In various embodiments of the present disclosure, data transport is optimized in the presence of potential congestion by a transport optimization process using one or more dynamic variables that are updated in real time to adapt to a current state of a network. The network may include a plurality of subnetworks each having distinct characteristics, which the transport optimization process may take into account. Furthermore, the transport optimization process may use information from the subnetworks that relates the unique characteristics of the subnetworks and in particular how congestion affects and may be detected on each subnetwork. The subnetworks may include Radio Access Networks (RANs), cable Internet Access networks (IANs), Digital Subscriber Line (DSL) IANs, fiber IANs, and the like.

The transport optimization process may provide inputs to a TCP implementation to control a congestion window of a TCP session in order to increase the bandwidth (i.e., accelerate) or decrease the bandwidth (i.e. decelerate) the TCP session. For example, the transport optimization process may direct the TCP implementation to skip a slow start stage, to begin a slow start stage with a larger initial congestion window, to change the respective amounts by which the congestion window is increased, decreased, or both during a congestion avoidance stage, or combinations thereof.

While several embodiments of the present disclosure have been illustrated and described herein, many changes can be made without departing from the spirit and scope of the invention. For example, it can be appreciated that the disclosure may be used in wireless networks, wired networks, fiber networks and coaxial networks alone, or in combination. Accordingly, the scope of the invention is not limited by any disclosed embodiment.

What is claimed is:

1. A method for optimizing network efficiency, the method comprising:

obtaining network topology information for a shared channel, the network topology information including information obtained by monitoring control and data packets transmitted through the channel;

determining, using the network topology information for the shared channel, a congestion control algorithm, a parameter of the congestion control algorithm, or both for a connection that uses the shared channel, including:

determining, using the network topology information, whether a valid congestion profile exists for the shared channel, and in response to determining that the valid congestion profile does not exist for the shared channel, determining the congestion control algorithm, the parameter of the congestion control algorithm, or both using a global default congestion profile or a default congestion profile determined according to a characteristic of the shared channel; and managing a data flow of the connection according to the congestion control algorithm, the parameter of the congestion control algorithm, or both.

2. The method of claim 1, wherein determining the congestion control algorithm comprises:

in response to a request to establish the connection, determining, using the network topology information, an Initial Congestion Window Algorithm (ICWA).

3. The method of claim 2, wherein determining the ICWA comprises selecting, according to the network topology information, an algorithm without a slow start stage.

4. The method of claim 2, wherein determining the ICWA comprises selecting, according to the network topology information, an algorithm having a fast slow start stage, wherein an initial congestion window is set according to a first parameter, and the congestion window grows by an exponentially increasing increment over time.

5. The method of claim 1, wherein determining the parameter of the congestion control algorithm includes determining a size of an initial congestion window according to the network topology information.

6. The method of claim 1, comprising updating parameters of the congestion control algorithm in response to changes in the network topology information.

7. The method of claim 1, comprising:

determining the congestion control algorithm, the parameter of the congestion control algorithm, or both using a congestion profile included in the network topology information, wherein the congestion profile includes:
one or more congestion-related time-windowed measurements of a data stream transported by the shared channel, and
an identifier of the shared channel.

8. The method of claim 1, comprising:

determining, according to the network topology information, to enlarge an advertised receive window of a device, the device being a first endpoint of the connection, by scaling the advertised receive window received from the device and transmitting the scaled advertised receive window to a second endpoint of the connection.

9. A method for optimizing network efficiency, the method comprising:

obtaining network topology information for a shared channel, the network topology information including information obtained by monitoring control and data packets transmitted through the channel;

determining, for a connection that uses the shared channel, a congestion control algorithm, a parameter of the congestion control algorithm, or both; and managing a data flow of the connection according to the congestion control algorithm, the parameter of the congestion control algorithm, or both, wherein determining the congestion control algorithm, the parameter of the congestion control algorithm, or both includes:

determining, using the network topology information, a target throughput for a device that is an endpoint of the connection;

determining, using the target throughput for the device, a target throughput for the connection, where the target throughput for the connection is different from the target throughput for the device; and determining the congestion control algorithm, the parameter of the congestion control algorithm, or both according to the target throughput for the connection.

10. A non-transitory computer readable medium (CRM) having computer-executable instructions embodied thereon that when executed by at least one processor cause the processor to perform a method for optimizing network efficiency, the method comprising:

obtaining network topology information for a shared channel, the network topology information including information obtained by monitoring control and data packets transmitted through the channel;

determining, using the network topology information, a congestion control algorithm, a parameter of the congestion control algorithm, or both for a connection that uses the shared channel, including:

determining, using the network topology information, whether a valid congestion profile exists for the shared channel, and in response to determining that the valid congestion profile does not exist for the shared channel, determining the congestion control algorithm, the parameter of the congestion control algorithm, or both using a global default congestion profile or a default congestion profile determined according to a characteristic of the shared channel; and managing a data flow of the connection according to the congestion control algorithm, the parameter of the congestion control algorithm, or both.

11. The CRM of claim 10, wherein determining the congestion control algorithm comprises:

in response to a request to establish the connection, determining, using the network topology information, an Initial Congestion Window Algorithm (ICWA).

12. The CRM of claim 11, wherein determining the ICWA comprises selecting, according to the network topology information, an algorithm without a slow start stage.

13. The CRM of claim 11, wherein determining the ICWA comprises selecting, according to the network topology information, an algorithm having a fast slow start stage, wherein an initial congestion window is set according to a first parameter, and the congestion window grows by an exponentially increasing increment over time.

14. The CRM of claim 10, wherein determining the parameter of the congestion control algorithm includes determining a size of an initial congestion window according to the network topology information.

15. The CRM of claim 10, wherein the method comprises updating parameters of the congestion control algorithm in response to changes in the network topology information.

16. The CRM of claim 10, wherein the method comprises:
determining the congestion control algorithm, the parameter of the congestion control algorithm, or both using a congestion profile included in the network topology information,
wherein the congestion profile includes:
one or more congestion-related time-windowed measurements of a data stream transported by the shared channel, and
an identifier of the shared channel.

17. The CRM of claim 10, wherein the method comprises:
determining, according to the network topology information, to enlarge an advertised receive window of a device, the device being a first endpoint of the connection, by scaling the advertised receive window received from the device and transmitting the scaled advertised receive window to a second endpoint of the connection.

18. The CRM of claim 10, wherein determining the congestion control algorithm, the parameter of the congestion control algorithm, or both includes:
determining, using the network topology information, a target throughput for a device that is an endpoint of the connection;
determining, using the target throughput for the device, a target throughput for the connection, where the target throughput for the connection is different from the target throughput for the device; and
determining the congestion control algorithm, the parameter of the congestion control algorithm, or both according to the target throughput for the connection.

* * * * *